United States Patent [19]

Yamashita

[11] Patent Number: 5,404,557
[45] Date of Patent: Apr. 4, 1995

[54] DATA PROCESSOR WITH PLURAL INSTRUCTION EXECUTION PARTS FOR SYNCHRONIZED PARALLEL PROCESSING AND EXCEPTION HANDLING

[75] Inventor: Hitoshi Yamashita, Nara, Japan

[73] Assignee: Matsushita Electric Industrial Co., Ltd., Osaka, Japan

[21] Appl. No.: 977,880

[22] Filed: Nov. 17, 1992

[30] Foreign Application Priority Data

Nov. 22, 1991 [JP] Japan .................................. 3-307333

[51] Int. Cl.$^6$ .......................... G06F 9/26; G06F 9/30; G06F 9/38
[52] U.S. Cl. .................................. 395/800; 364/229.5; 364/230; 364/230.6; 364/240.5; 364/242.93; 364/262.4; 364/262.8; 364/263; 364/263.3; 364/262.3; 364/268.4; 364/DIG. 1; 364/DIG. 2
[58] Field of Search ............... 395/800, 375, 650, 400, 395/425, 575, 325; 364/DIG. 1, DIG. 2

[56] References Cited

U.S. PATENT DOCUMENTS

| | | | |
|---|---|---|---|
| 4,001,788 | 1/1977 | Patterson et al. | 395/375 |
| 5,241,633 | 8/1993 | Nishi | 395/375 |
| 5,247,628 | 9/1993 | Grohoski | 395/375 |
| 5,280,615 | 1/1994 | Church et al. | 395/650 |

OTHER PUBLICATIONS

U.S. Ser. No. 07/580,718 filed Sep. 11, 1990, Edamatsu.
U.S. Ser. No. 07/861,327 filed Mar. 31, 1992, Yamashita.

*Primary Examiner*—Alyssa H. Bowler
*Assistant Examiner*—Daniel H. Pan
*Attorney, Agent, or Firm*—Willian Brinks Hofer Gilson & Lione

[57] ABSTRACT

A data processor with plural instruction execution parts for synchronized parallel processing which generates first information indicating the order of each group of instructions having successive instruction addresses and second information indicating the order of each instruction in each group of instructions, which feeds both information to any one of instruction execution parts so that such information is added to respective corresponding instructions. The address control part holds the address of a first instruction of each group of instructions so that an instruction address to be saved can be derived when an exception occurs. Only a first instruction of a first group of instructions is allowed to complete its execution in the instruction execution parts. The first information is updated together with the second information every time the execution of one instruction is completed. The supply of next instructions is brought to a stop on the detection of the occurrence of an exception. Each instruction execution part invalidates, at the time that the executions of all instructions fed earlier than an instruction that has detected the occurrence is complete, the processing of remaining instructions. Thus, the synchronization of one instruction execution with the other, the saving of an instruction address when an exception occurs, and the invalidation of instruction processing can all be realized, with less hardware.

15 Claims, 24 Drawing Sheets

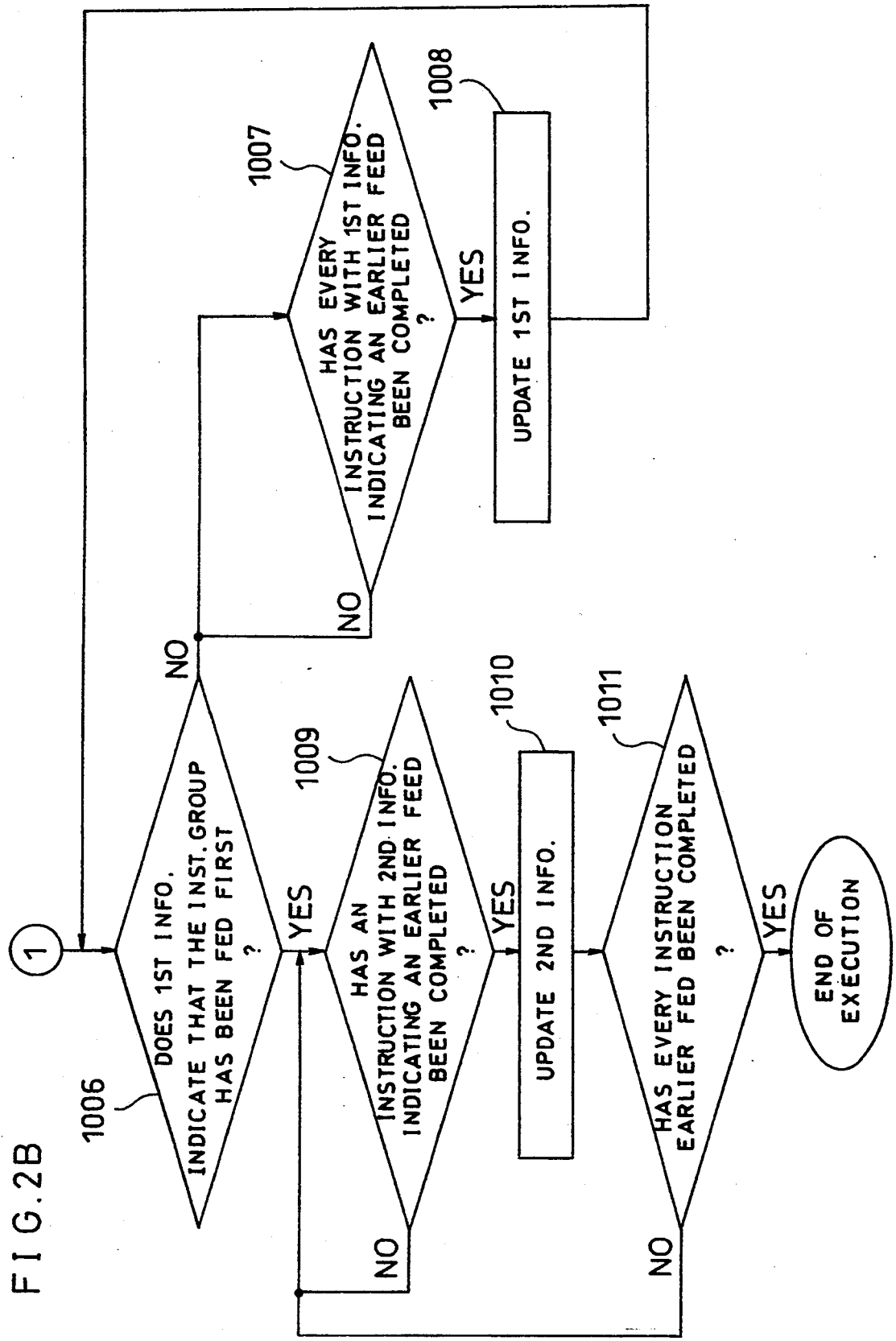

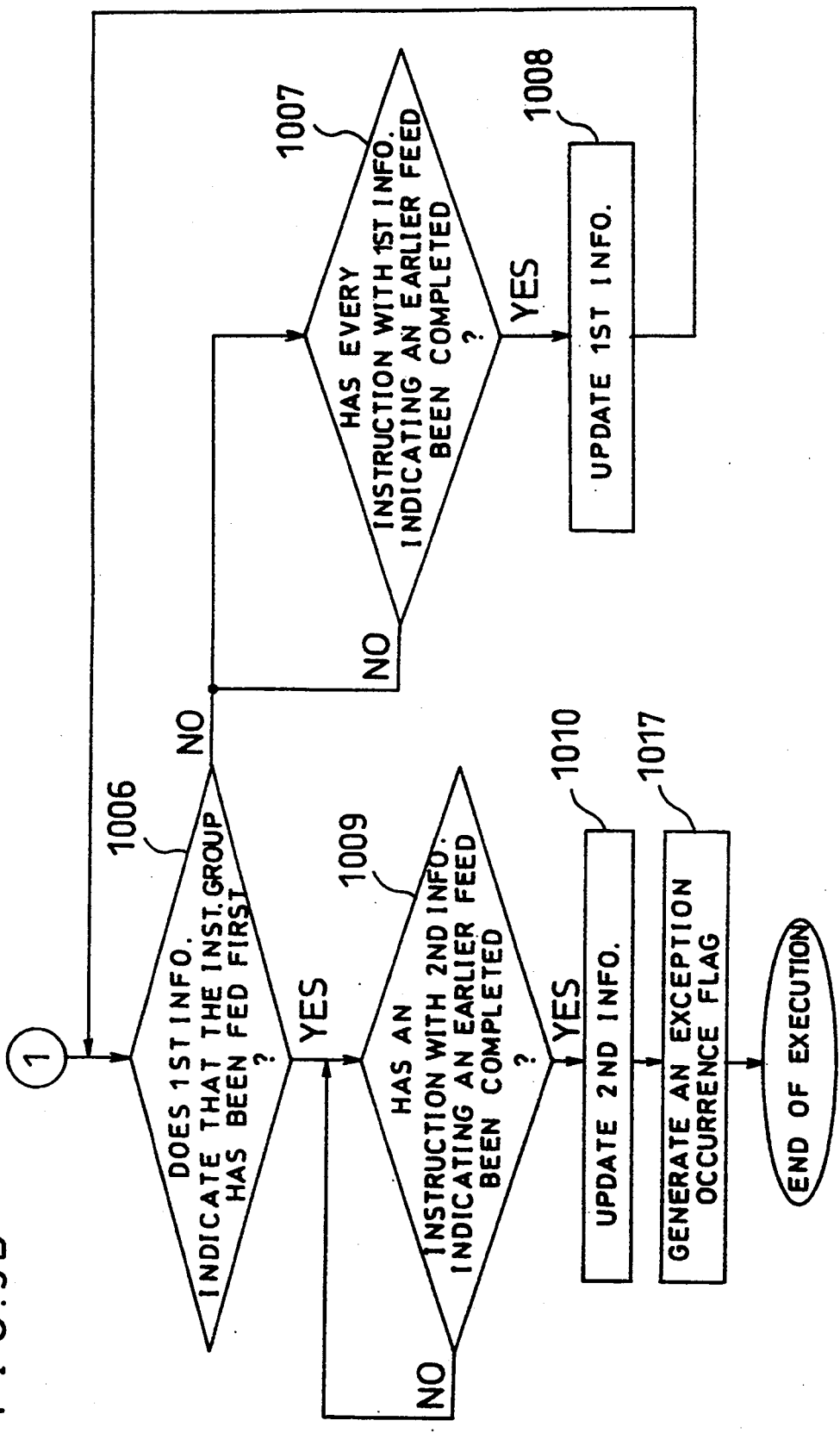

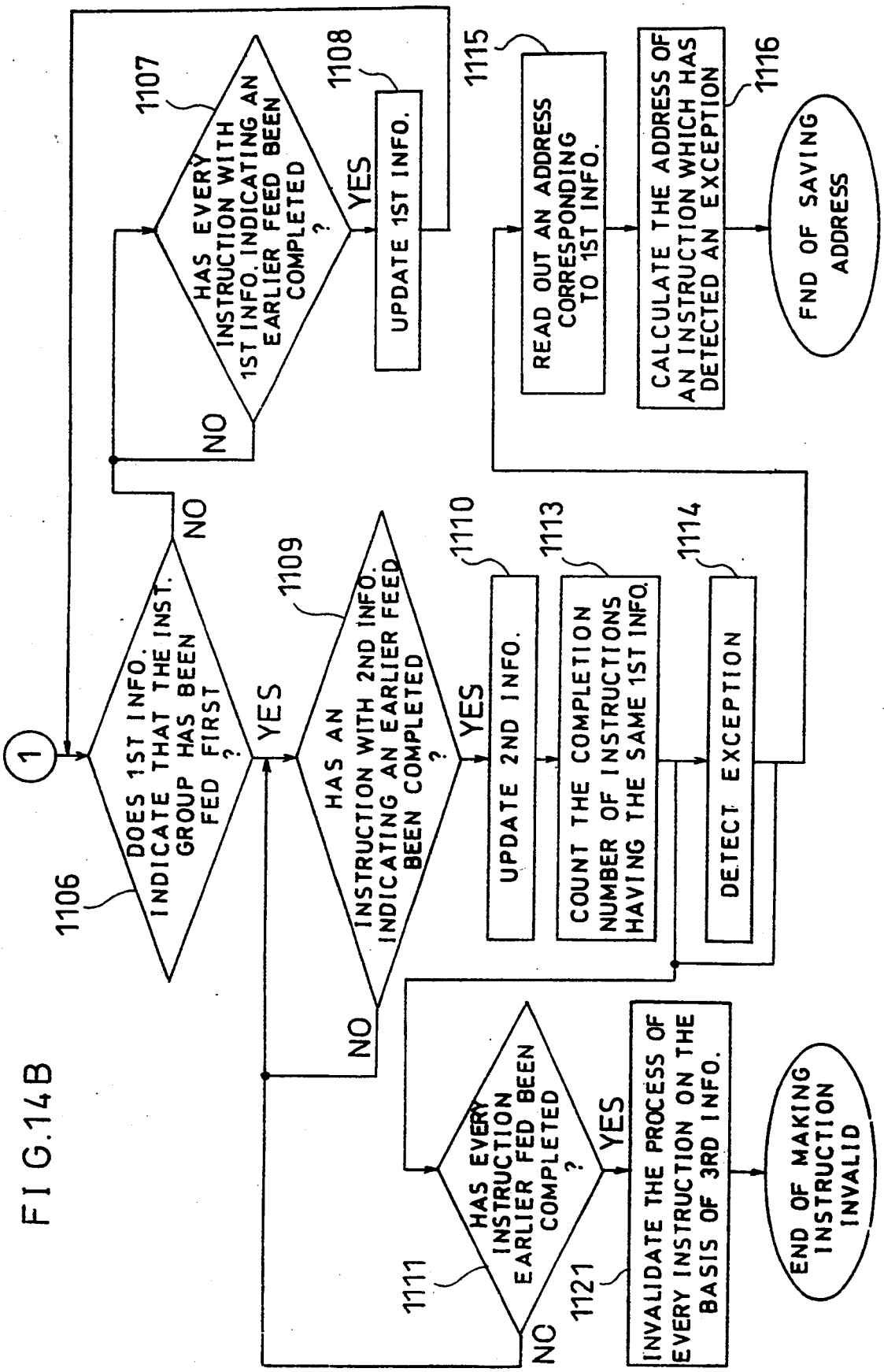

DATA PROCESSOR WITH PLURAL INSTRUCTION EXECUTION PARTS FOR SYNCHRONIZED PARALLEL PROCESSING AND EXCEPTION HANDLING

BACKGROUND OF THE INVENTION

This invention relates to a data processor with plural instruction execution parts, and it further relates to such methods as a method of synchronizing instruction executions, a method of saving an instruction address when an exception occurs, and a method of invalidating instruction processing when an exception occurs, in the aforesaid data processor.

For high-speed data processing, data processors with a plurality of instruction execution parts are known in the art. For example, there is a data processor in which instruction execution parts of different types (for example, one type for integer/logical operations and the other for floating-point operations) are independently arranged. Such difference in types of instruction execution parts usually results in different instruction execution time. Although the actual order of instruction executions may somewhat change, the contents of registers of the data processor at each time must be updated in the same order as that in which instructions are fed to be executed. This requirement will become more critical if the execution of an instruction is forced to be interrupted when an exception occurs. The control of the order of execution completion of instructions between one instruction execution part and the other (that is, synchronizing instruction executions) is important.

If an exception occurs when executing a certain instruction, its instruction address requires to be saved so that the instruction processing interrupted can resume starting with that instruction after exceptional handling. Further, the invalidation of instruction processing is required when an exception occurs, before re-executing instructions after exceptional handling.

Prior art data processors, however, have such a configuration that the addresses of instructions to be processed in a subordinate instruction execution part are also fed to a main instruction execution part for synchronization of instruction executions. As a result, a portion of the main instruction execution part is occupied by the addresses of instructions which are not processed in the main instruction execution part. This presents a problem that the processing of instruction execution cannot be carried out effectively because the main instruction execution part should deal with unnecessary instruction processing. Further, since the main instruction execution part holds the addresses of all instructions to be processed in itself and other instruction execution parts for saving their instruction addresses when an exception occurs, this requires more hardware in order to hold addresses in such a case that a great number of instructions are executed in parallel by many instruction execution parts as in a data processor employing super-scalar techniques. This causes a further barrier to meet demands for integrating many functions on a single chip of LSI.

SUMMARY OF THE INVENTION

With the foregoing background of the present invention in mind, it is therefore an object of the invention to allow instruction execution parts to operate independently as well as to synchronize instruction executions by means of less hardware without performing unnecessary instruction processing thereby processing instruction executions at high efficiency, in a data processor with plural instruction execution parts.

It is another object of the invention to achieve a substantial decrease in hardware that is used to hold an instruction address to be saved at the time that an exception occurs.

It is a further object of the invention to effectively accomplish the invalidation of instruction processing at the time that an exception occurs in a data processor that achieves the foregoing objects.

To achieve these objects, in accordance with the present invention, instructions, which are sequentially fed, are grouped into groups of instructions, each group comprised of instructions stored at successive instruction addresses, and two pieces of information (FIRST INFORMATION indicating the order of a group of instructions, and SECOND INFORMATION indicating the order of an instruction in a group of instructions) are added to every instruction to be fed to any one of the instruction execution parts. Thus, synchronizing instruction executions, saving an instruction address when an exception occurs, and effectively invalidating instruction processing are all controlled with the help of FIRST and SECOND INFORMATION.

If an instruction is found, by decoding, to be a first instruction of a group of instructions having successive instruction addresses, in other words, if an instruction is found to be the one fed next to a control a transfer instruction with a nature of changing the flow of a program, such an instruction is then additionally given FIRST INFORMATION indicating the order of feed of the group of instructions to which the instruction belongs in relation to all other groups of instructions under execution in the instruction execution parts, and SECOND INFORMATION indicating the first instruction of the group of instructions (that is, the instruction fed earlier than all others in the same group of instructions), and is fed to the instruction execution part in charge. If an instruction is not the first one, it is then given the same FIRST INFORMATION as the first instruction of the same group of instructions, and SECOND INFORMATION indicating its order of feed in relation to the first instruction. Updating of FIRST INFORMATION and SECOND INFORMATION added to each instruction is done per instruction execution completion in each one of the instruction execution parts. Even though a certain instruction gets ready for its execution completion, such an instruction cannot be execution-completed unless its FIRST INFORMATION indicates a first group of instructions, that is, the group of instructions fed earlier than all others under execution in both of the instruction execution parts, and its SECOND INFORMATION indicates a first instruction of the first group of instructions having the same FIRST INFORMATION. While making it possible to have the instruction execution parts independently execute their own instructions, the synchronization of one instruction execution with the other is achieved by the above-noted additional FIRST and SECOND INFORMATION to instructions, in completing such instruction executions. Thus, the efficiency of instruction execution can be improved. Further, even in such a particular case that instructions are fed to many instruction execution parts, as in a data processor employing super-scalar techniques, information based on which the order of instruction execution completion is determined can be simplified, which are major advantages for realizing the synchronization of instruction executions in a data processor.

Instead of holding the addresses of all instructions in preparation for the occurrence of an exception, a single instruction address is held per group of instructions having successive instruction addresses so that an instruction address to be saved is derived, based on FIRST and SECOND INFORMATION, at the time that an exception occurs. Because of this, holding instruction addresses to be saved can be accomplished with much less hardware.

An instruction feed part stops feeding next instructions on the detection of the occurrence of an exception. Besides FIRST and SECOND INFORMATION, THIRD INFORMATION, indicating the presence or absence of the occurrence of an exception, is further added to an instruction when fed to the instruction execution part in charge. Accordingly, instruction processing in each one of the instruction execution parts can easily be invalidated when the executions of all instructions fed earlier than an instruction that has detected the occurrence of an exception are executed, and the instruction that has detected the occurrence of an exception becomes a first instruction of a first group of instructions. If instructions of a group of instructions for exceptional handling are fed to the instruction execution part early on, apart from instructions with THIRD INFORMATION indicating their invalidation processing, this achieves high-speed exceptional handling.

BRIEF DESCRIPTION OF THE DRAWINGS

This invention will be more clearly understood by reference to the accompanying drawings wherein:

FIGS. 2(A) and 2(B) illustrate a flow chart showing how the data processor of the first embodiment of the invention synchronizes instruction executions;

FIGS. 9(A) and 9(B) illustrate a first flow chart showing how the data processor of the fourth embodiment of the invention invalidates instruction processing in a modified way when an exception occurs;

FIGS. 14(A) and 14(B) illustrate a second flow chart showing how the data processor of the fifth embodiment of the invention invalidates instruction processing in a modified way when an exception occurs.

PREFERRED EMBODIMENTS OF THE INVENTION

Preferred embodiments of the present invention are now described by referring to the accompanying drawings.

FIRST EMBODIMENT

Figure 1:
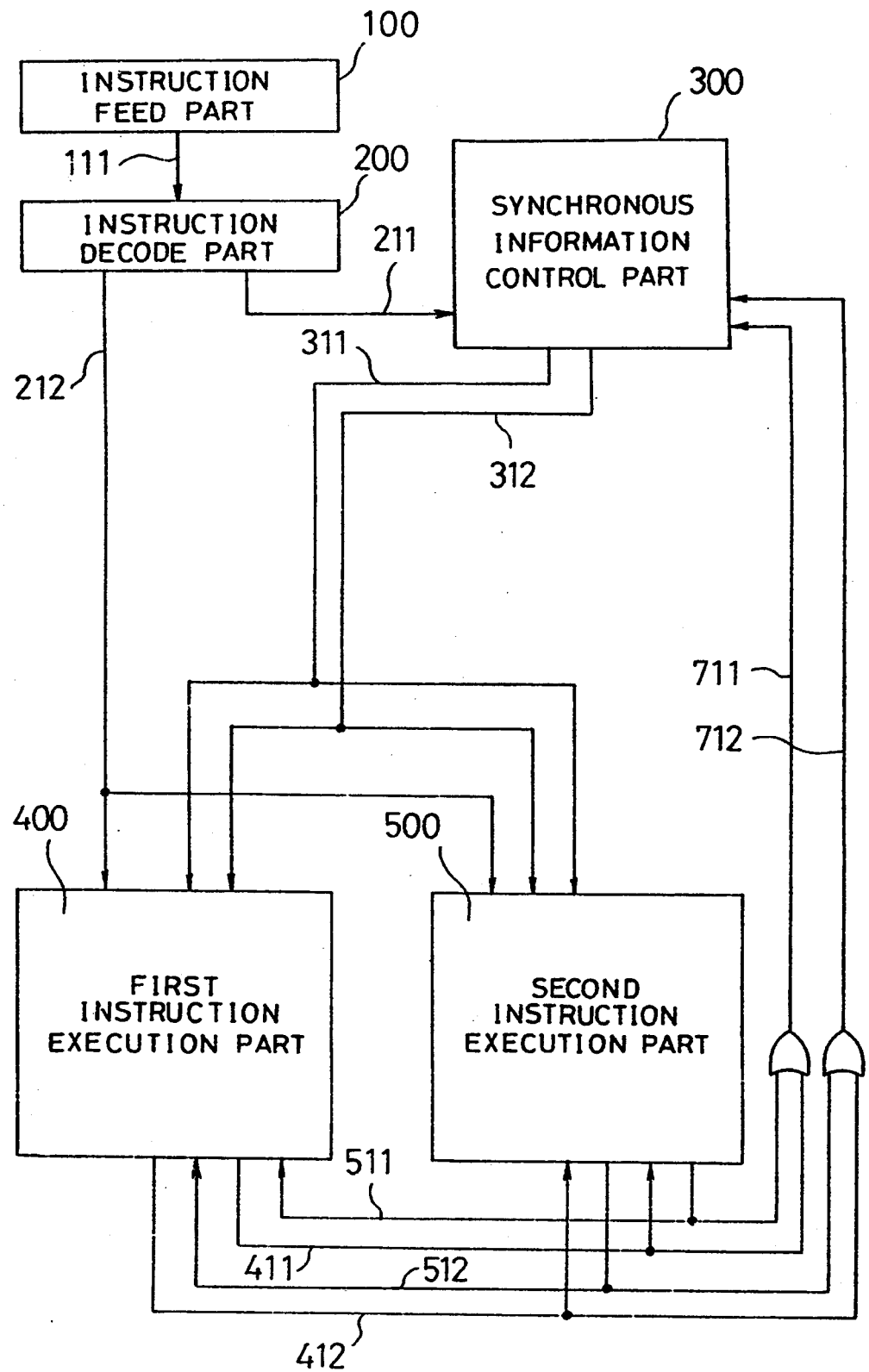
FIG. 1 is a block diagram showing the organization of a data processor of a first embodiment of the present invention.

A data processor, shown in FIG. 1, has two instruction execution parts, a first instruction execution part 400 and a second instruction execution part 500, an instruction feed part 100 for feeding instructions to the instruction execution parts 400 and 500, an instruction decode part 200 for decoding an instruction fed from the instruction feed part 100, and a synchronous information control part 300 for generating information that is added to such a decoded instruction when it is fed either to the first instruction execution part 400 or to the second instruction execution part 500 to be processed.

INSTRUCTION, indicated by the reference numeral 111, is fed from the instruction feed part 100. DECODED INFORMATION, indicated by the reference numeral 211, shows whether an instruction decoded is effective, and it further shows whether the decoded instruction is a first instruction of a group of instructions having successive instruction addresses (that is, it indicates whether it is an instruction fed next to a control transfer instruction with a nature of changing the flow of a program). The reference numeral 212 represents DECODED INSTRUCTION. The reference numerals 311 and 312 represent FIRST and SECOND INFORMATION, respectively, and DECODED INSTRUCTION 212, when fed to the instruction execution part to be processed, is given such additional information.

FIRST INSTRUCTION EXECUTION COMPLETION SIGNAL (hereinafter referred to as "FIRST IECS") for instructions to be processed in the first instruction execution part 400, indicated by the reference numeral 411, conveys a message that of all instructions under execution in both instruction execution parts, a certain instruction, having FIRST INFORMATION indicating a first group of instructions (that is, the group fed earlier than all others), and SECOND INFORMATION indicating a last instruction (that is, the instruction fed last) of the first group of instructions, is completed.

SECOND INSTRUCTION EXECUTION COMPLETION SIGNAL (SECOND IECS) for instructions to be processed in the first instruction execution part 400, indicated by the reference numeral 412, conveys a message that of all instructions under execution in both instruction execution parts, a certain instruction, having FIRST INFORMATION indicating a first group of instructions, and SECOND INFORMATION indicating a first instruction (that is, the instruction fed first) of the first group of instructions, is completed.

THIRD INSTRUCTION EXECUTION COMPLETION SIGNAL (THIRD IECS) for instructions to be processed in the second instruction execution part 500, indicated by the reference numeral 511, conveys a message that of all instructions under execution in both instruction execution parts, a certain instruction, having FIRST INFORMATION indicating a first group of instructions, and SECOND INFORMATION indicating a last instruction of the first group of instructions, is completed.

FOURTH INSTRUCTION EXECUTION COMPLETION SIGNAL (FOURTH IECS) for instructions to be processed in the second instruction execution part 500, indicated by the reference numeral 512, conveys a message that of all instructions under execution in both instruction execution parts, a certain instruction, having FIRST INFORMATION indicating a first group of instructions, and SECOND INFORMATION indicating a first instruction of the first group of instructions, is completed.

FIRST OR SIGNAL, indicated by the reference numeral 711, is a signal as a result of a logical sum of FIRST IECS 411 and THIRD IECS 511, which shows that the execution of a last instruction of a first group of instructions is completed, SECOND OR SIGNAL, indicated by the reference numeral 712, is a signal as a result of a logical sum of SECOND IECS 412 and FOURTH IECS 512, which shows that the execution of a first instruction of a first group of instructions is completed.

Figure 2A:
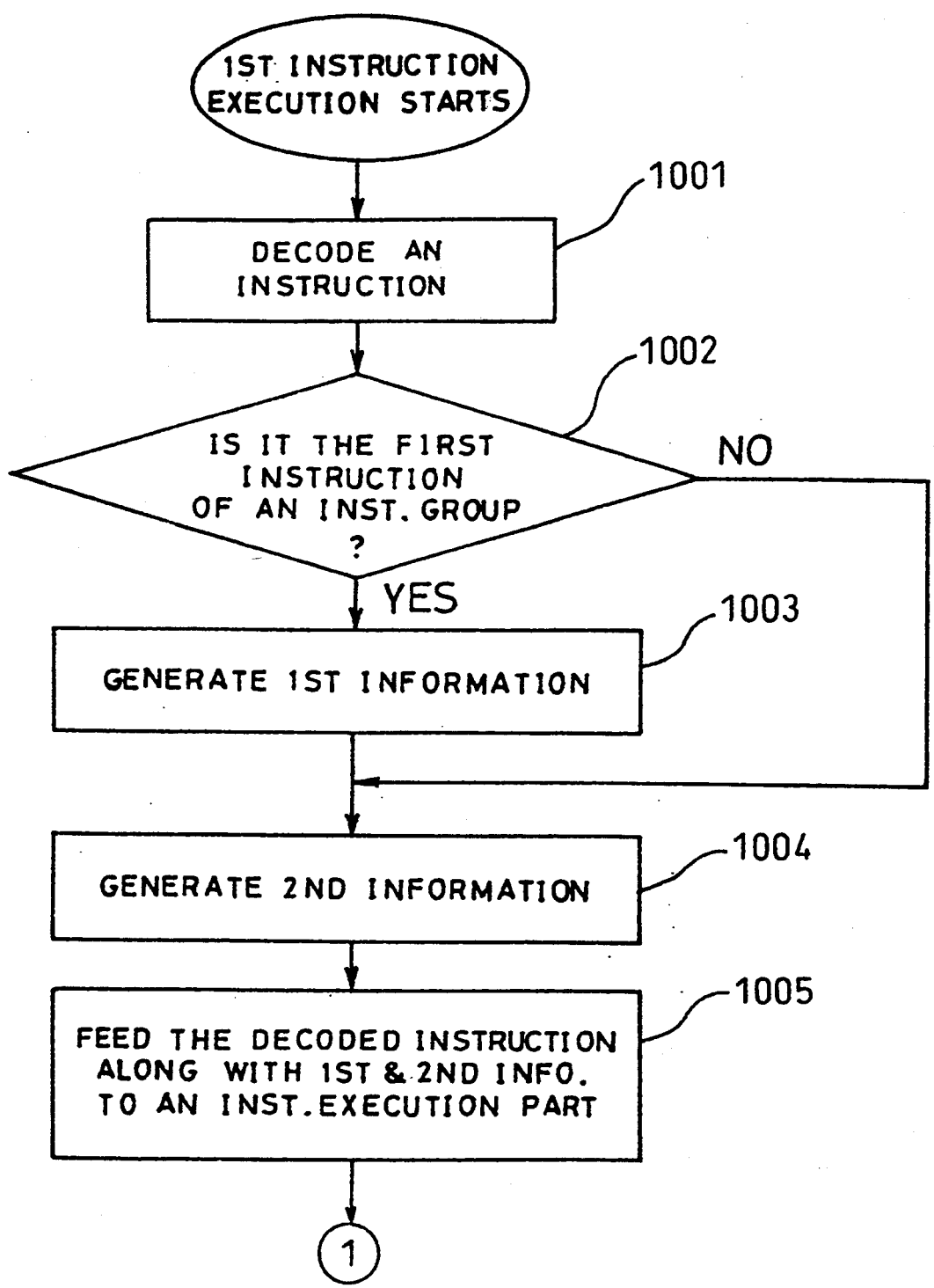

In the foregoing data processor having the two instruction execution parts 400 and 500, upon receiving INSTRUCTION 111 from the instruction feed part 100, the instruction decode part 200 decodes INSTRUCTION 111 to learn which of the instruction execution parts is to process it, and to find out whether it is a first instruction of a group of instructions having successive instruction addresses in other words, to find out whether or not the preceding instruction is a control transfer instruction with a nature of changing the flow of a program (STEPS 1001 and 1002 in FIG. 2(A).

If DECODED INSTRUCTION 212 is found to be a first instruction of a group of instructions having successive instruction addresses, in other words, if DECODED INSTRUCTION 212 and its preceding instruction are not stored at successive instruction addresses, the synchronous information control part 300 generates FIRST INFORMATION 311 indicating the order of feed of such a group of instructions in relation to all other groups of instructions under execution in the instruction execution parts 400 and 500 (STEP 1003), and SECOND INFORMATION 312 indicating the first instruction of the group of instructions (STEP 1004).

If DECODED INSTRUCTION 212 is meanwhile found to be other instructions other than a first instruction, the same FIRST INFORMATION as given for the first instruction and SECOND INFORMATION indicating the order of feed of DECODED INSTRUCTION 212 in relation to the first instruction are generated (STEP 1004). DECODED INSTRUCTION 212, along with its FIRST and SECOND INFORMATION 311 and 312, is supplied either to the first instruction execution part 400 or to the second instruction execution part 500 to be processed (STEP 1005).

If FIRST INFORMATION, added to a certain instruction which advances either through the first instruction execution part 400 or through the second instruction execution part 500, does not indicate a first group of instructions of all other groups to be processed in both instruction execution parts, FIRST INFORMATION of all instructions under execution in both the instruction execution parts is updated every time the executions of all instructions belonging to a first group of instructions are completed (STEPS 1006, 1007, and 1008).

If FIRST INFORMATION, added to a certain instruction, indicates a first group of instructions, and SECOND INFORMATION does not indicate a first instruction of the group, SECOND INFORMATION of each one of instructions belonging to the same group of instructions under execution in both instruction execution parts is updated every time the execution of an instruction having SECOND INFORMATION indicating a first instruction is completed (STEPS 1009, 1010, and 1011), If FIRST INFORMATION, added to a certain instruction, indicates a first group of instructions, and SECOND INFORMATION indicates a first instruction of the first group of instructions, such an instruction which advances through the first instruction execution part 400 or through the second instruction execution part 500 is in a position of being able to complete its execution (STEP 1011).

An example to clarify the above-noted synchronization of one instruction execution with the other is now given below. For instance, six instructions, FIRST INSTRUCTION C1, SECOND INSTRUCTION A1, THIRD INSTRUCTION B1, FOURTH INSTRUCTION C2, FIFTH INSTRUCTION A2, and SIXTH INSTRUCTION B2 are supplied from the instruction feed part 100 in the following order.

C1 → A1 → B1 → C2 → A2 → B2

INSTRUCTIONS C1 and C2 are control transfer instructions, and the remaining INSTRUCTIONS, A1, A2, B1, and B2 are noncontrol transfer instructions. INSTRUCTIONS C1, A1, and A2 will be processed by the first instruction execution part 400, and INSTRUCTIONS C2, B1, and B2 the second instruction execution part 500. Each of the operation processes is shown in TABLE.

TABLE

| NO. | STATE | 1ST INST. EXEC. PART | | | 2ND INST. EXEC. PART | | |
| --- | --- | --- | --- | --- | --- | --- | --- |
| | | INST. | 1ST INFO. | 2ND INFO. | INST. | 1ST INFO. | 2ND INFO. |
| 1 | C1, A1, B1 & C2 FED | C1 | 1 | 1 | B1 | 2 | 2 |
| | | A1 | 2 | 1 | C2 | 2 | 3 |
| 2 | C1 COMPLETED | A1 | 1 | 1 | B1 | 1 | 2 |
| | | — | | | C2 | 1 | 3 |

TABLE-continued

| NO. | STATE | 1ST INST. EXEC. PART | | | 2ND INST. EXEC. PART | | |
|---|---|---|---|---|---|---|---|
| | | INST. | 1ST INFO. | 2ND INFO. | INST. | 1ST INFO. | 2ND INFO. |
| 3 | A2 & B2 FED | A1 | 1 | 1 | B1 | 1 | 2 |
| | | A2 | 2 | 1 | C2 | 1 | 3 |
| | | | | | B2 | 2 | 2 |
| 4 | A1 COMPLETED | A2 | 2 | 1 | B1 | 1 | 1 |
| | | | | | C2 | 1 | 2 |
| | | | | | B2 | 2 | 2 |
| 5 | B1 COMPLETED | A2 | 2 | 1 | C2 | 1 | 1 |
| | | | | | B2 | 2 | 2 |
| 6 | C2 COMPLETED | A2 | 1 | 1 | B2 | 1 | 2 |
| 7 | A2 COMPLETED | | | | B2 | 1 | 1 |

Upon receiving FIRST INSTRUCTION C1 from the instruction feed part 100, the instruction decode part 200 learns that FIRST INSTRUCTION C1 is a control transfer instruction thereby setting a transfer flag to indicate that it has decoded a control transfer instruction. Upon the completion of decoding FIRST INSTRUCTION C1, based on DECODED INFORMATION 211 showing that FIRST INSTRUCTION C1 is an effective instruction and has not been fed next to a control transfer instruction, the synchronous information control part 300 generates FIRST INFORMATION 311 showing that of all instructions to be processed in both the first instruction execution part 400 and the second instruction execution part 500, FIRST INSTRUCTION C1 belongs to a first group of instructions, and SECOND INFORMATION 312 showing that FIRST INSTRUCTION C1 is a first instruction of the first group. Decoded FIRST INSTRUCTION C1, along with its FIRST and SECOND INFORMATION 311 and 312, is fed to the first instruction execution part 400 to be processed. Then FIRST INSTRUCTION C1 starts being executed.

In this embodiment, the generation (and updating) of FIRST INFORMATION is limited so that it is generated only for a first instruction, or an earliest fed instruction of a group of instructions (i.e., the instruction fed following a control transfer instruction) having successive instruction addresses, and an ordinal value in relation to a first instruction is generated, as SECOND INFORMATION. In such a case that no effective instructions are being executed in the first instruction execution part 400 or the second instruction execution part 500 (as in FIRST INSTRUCTION C1), an earliest fed instruction shall be dealt with as a first instruction in a group of instructions having successive instruction addresses.

Next, upon receiving SECOND INSTRUCTION A1 from the instruction feed part 100, the instruction decode part 200 learns from the set transfer flag that the preceding instruction (i.e., FIRST INSTRUCTION C1) is a control transfer instruction thereby outputting DECODED INFORMATION 211 showing that SECOND INSTRUCTION A1 is an effective instruction and is a first instruction of a group of instructions having successive instruction addresses as well as resetting the transfer flag. Based on DECODED INFORMATION 211 that SECOND INSTRUCTION A1 is the first instruction, the synchronous information control part 300 generates FIRST INFORMATION 311 showing that of all instructions to be processed in both instruction execution parts, SECOND INSTRUCTION A1 belongs to a second group of instructions, and SECOND INFORMATION 312 showing that SECOND INSTRUCTION A1 is the first of the second group of instructions. SECOND INSTRUCTION A1 decoded, along with its FIRST and SECOND INFORMATION 311 and 312, is fed to the first instruction execution part 400 to be processed. Then SECOND INSTRUCTION A1 starts being executed.

THIRD INSTRUCTION B1, fed from the instruction feed part 100, is received by the instruction decode part 200 which learns from the reset transfer flag that the preceding instruction, that is, SECOND INSTRUCTION A1 is a non-control transfer instruction thereby outputting DECODED INFORMATION 211 that THIRD INSTRUCTION B1 is not a first instruction but is an effective instruction. Based on INFORMATION 211 that THIRD INSTRUCTION B1 is not the first instruction, the synchronous information control part 300 generates FIRST INFORMATION 311 which informs that B1, like A1, belongs to the second group of instructions, and SECOND INFORMATION 312 which informs that THIRD INSTRUCTION B1 is a second instruction from SECOND INSTRUCTION A1 of the second group of instructions. Thereafter, THIRD INSTRUCTION B1, along with its FIRST and SECOND INFORMATION 311 and 312, is fed to the second instruction execution part 500 to be processed. Then THIRD INSTRUCTION B1 starts being executed.

Upon receiving FOURTH INSTRUCTION C2 from the instruction feed part 100, the instruction decode part 200 learns that FOURTH INSTRUCTION C2 is a control transfer instruction thereby setting the transfer flag. Upon the completion of decoding C2, based on DECODED INFORMATION 211 which informs that FOURTH INSTRUCTION C2 is not a first instruction but is an effective instruction, the synchronous information control part 300 generates FIRST INFORMATION 311 which informs that FOURTH INSTRUCTION C2 belongs to the second group of instructions, and SECOND INFORMATION 312 which informs that of all instructions having the same FIRST INFORMATION under execution in both the first instruction execution part 400 and the second instruction execution part 500, FOURTH INSTRUCTION C2 is a third instruction. FOURTH INSTRUCTION C2, along with its FIRST and SECOND INFORMATION 311 and 312, is fed to the second instruction execution part 500 to be processed. Then FOURTH INSTRUCTION C2 starts being executed. This is shown in STATE 1 of TABLE.

Thereafter, the execution of FIRST INSTRUCTION C1 is completed in the first instruction execution part 400, which asserts FIRST IECS 411 and SECOND IECS 412 so that they are brought into their active states because FIRST INSTRUCTION C1 has FIRST INFORMATION indicating the earliest fed (first) group of instructions, and SECOND INFORMATION indicating the first instruction as well as the last instruction of the first group of instructions. Due to such assertion, respective FIRST INFORMATION of INSTRUCTION A1, which is being processed in the first instruction execution part 400, and INSTRUCTIONS B1 and C2, both of which are being processed in the second instruction execution part 500, is updated. That is, as shown by FIRST and SECOND INFORMATION in STATE 2 of TABLE, additional information, comprised of FIRST and SECOND INFORMATION, now indicates that of all instructions under execution in both of the instruction execution parts, INSTRUCTION A1 belongs to a first group of instructions (FIRST INFORMATION), and is a first instruction of the first group of instructions. Similarly, INSTRUCTION B1 belongs to the first group of instructions, and is a second instruction of the first group of instructions, and INSTRUCTION C2 belongs to the first group of instructions, and is a third instruction of the first group of instructions.

Upon receiving FIFTH INSTRUCTION A2 from the instruction feed part 100, the instruction decode part 200 learns from the set transfer flag that the preceding instruction (i.e., FOURTH INSTRUCTION C2) is a control transfer instruction thereby outputting DECODED INFORMATION 211 that FIFTH INSTRUCTION A2 is an effective instruction and is a first instruction of a group of instructions as well as resetting the transfer flag. Based on INFORMATION 211 that FIFTH INSTRUCTION A2 is the first instruction, the synchronous information control part 300 generates FIRST INFORMATION 311 which informs that FIFTH INSTRUCTION A2 falls into a second group of instructions, and SECOND INFORMATION 312 which informs that FIFTH INSTRUCTION A2 is the first instruction of the second group of instructions. Thereafter, FIFTH INSTRUCTION A2, along with its FIRST and SECOND INFORMATION 311 and 312, is fed to the first instruction execution part 400 to be processed. Then FIFTH INSTRUCTION A2 starts being executed.

During the instruction execution in both of the instruction execution parts, the originalities of individual instructions are held in execution, while on the other hand the execution of instructions must be performed and completed in the same order that they are fed from the instruction feed part 100. To sum up, as long as the execution of SECOND INSTRUCTION A1 is not finished in the first instruction execution part 400, THIRD INSTRUCTION B1 in the instruction execution part 500 must wait for the execution of SECOND INSTRUCTION A1 to be finished even though it has reached an execution completable state earlier than SECOND INSTRUCTION A1. This is controlled by FIRST and SECOND INFORMATION added to each one of instructions. For example, in the case that instructions have the same FIRST INFORMATION, the order of execution completion is subject to their SECOND INFORMATION, that is, the one, having SECOND INFORMATION indicating an earlier feed than the others from the instruction feed part 100, has priority to be completed first over the others. Further, even though an instruction having SECOND INFORMATION indicating its priority over the remaining in the same group of instructions is not in a position to complete its execution if its FIRST INFORMATION does not indicate that of all instructions under execution in both of the instruction execution parts, it belongs to a first group of instructions. In accordance with the invention, the order of completing instruction executions is controlled through FIRST INFORMATION and SECOND INFORMATION added to each instruction under execution in each instruction execution part, and FIRST and SECOND INFORMATION added to each instruction under execution in each instruction execution part are updated every time the execution of an earlier fed instruction is completed.

SIXTH INSTRUCTION B2, fed from the instruction feed part 100, is received by the instruction decode part 200 which learns from the reset transfer flag that the preceding instruction, FIFTH INSTRUCTION A2 fed just prior to SIXTH INSTRUCTION B2 is a non-control transfer instruction thereby outputting DECODED INFORMATION 211 that SIXTH INSTRUCTION B2 is not a first instruction but is an effective instruction. Based on such DECODED INFORMATION 211 that INSTRUCTION B2 is not a first instruction, the synchronous information control part 300 generates FIRST INFORMATION 311 indicating that of all instructions to be processed in both instruction execution parts, SIXTH INSTRUCTION B2, like FIFTH INSTRUCTION A2, falls into the second group of instructions, and SECOND INFORMATION 312 indicating that SIXTH INSTRUCTION B2 is a second instruction of the second group of instructions. Thereafter, SIXTH INSTRUCTION B2, along with its FIRST and SECOND INFORMATION 311 and 312, is fed to the second instruction execution part 500 to be processed. Then SIXTH INSTRUCTION B2 starts being executed. The above is shown in STATE 3 of TABLE.

Thereafter, the execution of SECOND INSTRUCTION A1 is completed in the first instruction execution part 400, which asserts SECOND IECS 412 because SECOND INSTRUCTION A1 has FIRST INFORMATION indicating that it falls into a first group of instructions, and SECOND INFORMATION indicating that it is a first instruction thereof. Due to such assertion, respective SECOND INFORMATION of THIRD and FOURTH INSTRUCTIONS B1 and C2 under execution in the second instruction execution part 500 is updated. FIRST INFORMATION and SECOND INFORMATION in STATE 4 of TABLE now indicate the following. Of all instructions under execution in both the instruction execution parts THIRD INSTRUCTION B1 belongs to the first group of instructions, and is a first instruction thereof. Likewise, FOURTH INSTRUCTION C2 belongs to the first group of instructions, and is a second instruction. FIFTH and SIXTH INSTRUCTIONS A2 and B2 under execution in the first and second instruction execution parts 400 and 500 have different FIRST INFORMATION from SECOND INSTRUCTION A1. Accordingly, the completion of the execution of SECOND INSTRUCTION A1 does not cause FIRST and SECOND INFORMATION of INSTRUCTIONS A2 and B2 to be updated.

As soon as the execution of THIRD INSTRUCTION B1 is completed in the second instruction execution part 500, FOURTH IECS 512 is brought into its active state. Due to such assertion, SECOND INFOR- MATION of FOURTH INSTRUCTION C2 under execution in the second instruction execution part 500, is updated. FIRST INFORMATION and SECOND INFORMATION in STATE 5 of TABLE now indicate the following. Of all instructions under execution in both the instruction execution parts FOURTH INSTRUCTION C2 belongs to the first group of instructions, and is a first (and last) instruction of the first group of instructions. INSTRUCTIONS A2 and B2 under execution in the first and second instruction execution parts 400 and 500 respectively have different FIRST INFORMATION from THIRD INSTRUCTION B1 so that the completion of the execution of THIRD INSTRUCTION B1 does not accompany the updating of FIRST and SECOND INFORMATION of INSTRUCTIONS A2 and B2.

Thereafter, the execution of FOURTH INSTRUCTION C2 is completed in the second instruction execution part 500, which asserts both of THIRD IECS 511 and FOURTH IECS 512. Due to such assertion, FIRST INFORMATION of INSTRUCTIONS A2 and B2 under execution in the first and second instruction execution parts 400 and 500 respectively is updated. FIRST INFORMATION and SECOND INFORMATION in STATE 6 of TABLE now indicate the following. Of all instructions under execution in both instruction execution parts, FIFTH INSTRUCTION A2 belongs to a first group of instructions and is a first instruction of the first group of instructions, and SIXTH INSTRUCTION B2 belongs to the first group of instructions and is a second instruction of the first group of instructions.

The completion of the execution of FIFTH INSTRUCTION A2 in the first instruction execution part 400 asserts SECOND IECS 412. Due to such assertion of SECOND IECS 412, SECOND INFORMATION of INSTRUCTION B2 under execution in the second instruction execution part 500 is updated. FIRST INFORMATION and SECOND INFORMATION in STATE 7 of TABLE now indicate the following. Of all instructions under execution in both of the instruction execution parts, INSTRUCTION B2 belongs to the first group of instructions (FIRST INFORMATION), and is a first instruction as well as a last instruction of the first group of instructions (SECOND INFORMATION).

Finally, as soon as the execution of INSTRUCTION B2 under execution in the second instruction execution part 500 is completed, both THIRD IECS 511 and FOURTH IECS 512 are brought into their active states. Here, no effective instructions are being executed in the first instruction execution part 400 or the second instruction execution part 500. This results in the return to the original state before the execution of the foregoing six instructions begins.

In accordance with the first embodiment, although the first instruction execution part 400 and the second instruction execution part 500 independently process their own instructions, the order of execution completion of instructions in both instruction execution parts can be controlled easily because of FIRST INFORMATION and SECOND INFORMATION, added to each instruction, indicating whether a certain instruction about to complete its execution belongs to a first group of instructions, and whether it is a first instruction of the first group of instructions.

Additionally, since FIRST and SECOND INFORMATION, added to instructions under execution in both instruction execution parts, is updated every time the execution of a preceding instruction is completed, this makes it possible to simplify information for synchronization to a further extent, compared to a control method in which the order of instruction execution completion is controlled by comparing various instruction addresses or flags. This is particularly true for a data processor with a great number of instruction execution parts such as in super-scalar. The configuration of a data processor can considerably be simplified and the efficiency of instruction processing is improved.

One instruction under execution in the first instruction execution part 400 and the other under execution in the second instruction execution part 500 can be completed at the same time (although such is not described in the foregoing description), since FIRST IECS 411 and SECOND IECS 412 are fed from the first instruction execution part 400 to the second instruction execution part 500, while on the other hand THIRD IECS 511 and FOURTH IECS 512 are fed the other way round, that is, from the second instruction execution part 500 to the first instruction execution part 400.

SECOND EMBODIMENT

Figure 3:
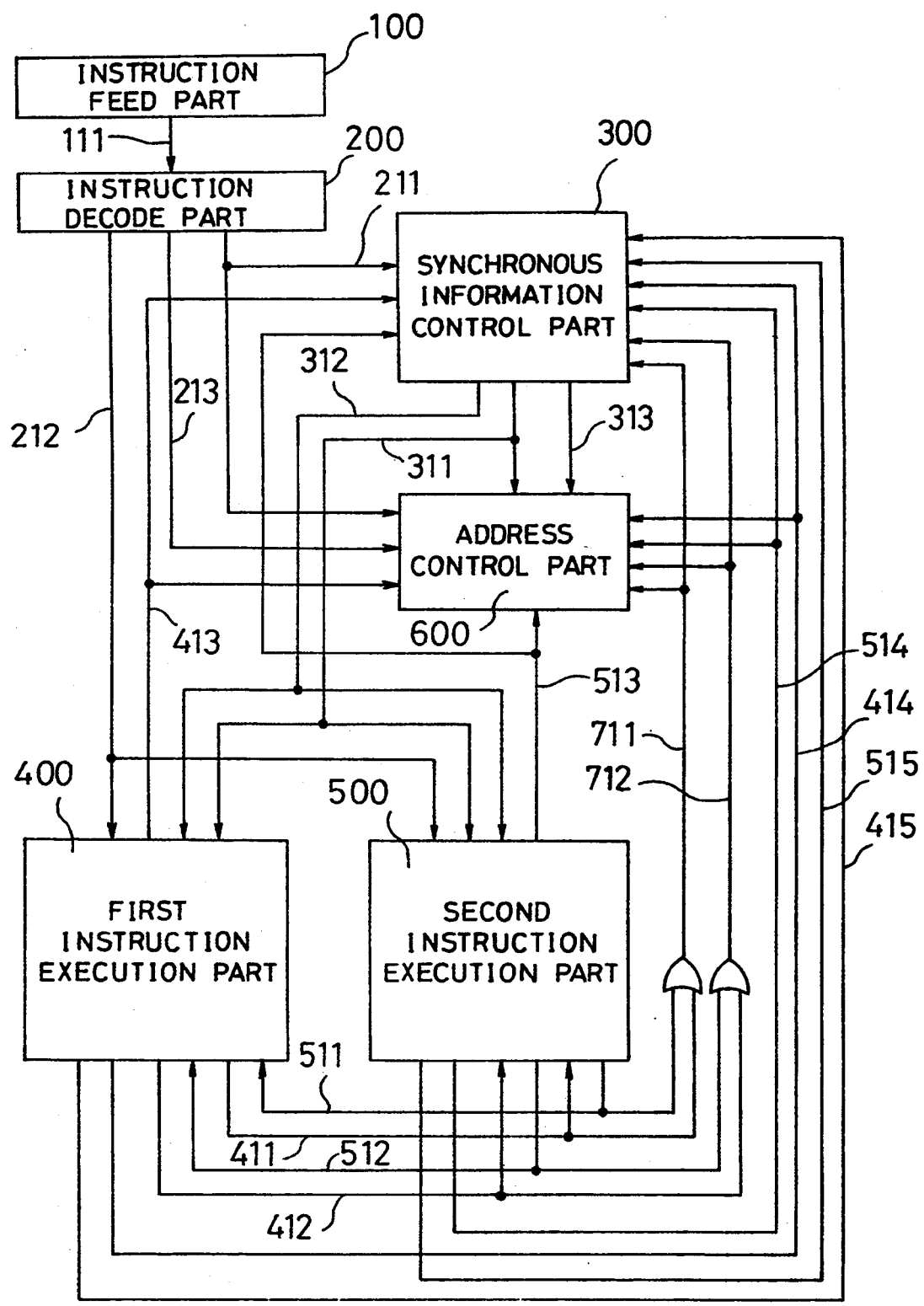
FIG. 3 is a block diagram showing the organization of data processors of second and third embodiments of the invention.

The second embodiment functionally differs from the first embodiment in that it further performs the function of saving an instruction address in the data processor of the first embodiment that accomplishes the synchronization of instruction executions. FIG. 3 contains the contents of FIG. 1, and FIGS. 4(A) and 4(B) contain the contents of FIGS. 2(A) and 2(B). Mainly focusing on its new features, this embodiment is now described.

A data processor of FIG. 3 includes an address control part 600, besides the synchronous information control part 300. The synchronous information control part 300 generates FIRST and SECOND INFORMATION 311 and 312. DECODED INSTRUCTION 212, when fed to the instruction execution part to be processed, is given INFORMATION 311 and 312 by the synchronous information control part 300. The synchronous information control part 300 performs the function of counting the number of instruction execution completion for instructions having FIRST INFORMATION indicating a first group of instructions (that is, the group of instructions fed from the instruction feed part 100 earlier than all others) in both the instruction execution parts 400 and 500, and it further performs the function of generating ADDRESS CORRECTION VALUE 313 to derive, on the basis of the obtained count value and SECOND INFORMATION added to an instruction that has detected the occurrence of an exception, the address of the instruction that has detected the occurrence of an exception.

The address control part 600 holds therein ADDRESS 213 of the first instruction of each group of instructions, which further performs the function of reading out, on the basis of FIRST INFORMATION added to an instruction that has detected the occurrence of an exception, an instruction address corresponding to such FIRST INFORMATION to derive and save the address of the instruction that has detected the occurrence of an exception by using ADDRESS CORRECTION VALUE 313 generated in the synchronous information control part 300.

FIRST EXCEPTION DETECTION SIGNAL, indicated by the reference numeral 413, is a signal for instructions to be executed in the first instruction execution part 400. FIRST INFORMATION, indicated by the reference numeral 414, is one piece of information added to an instruction which has detected the occurrence of an exception in the first instruction execution part 400. SECOND INFORMATION, indicated by the reference numeral 415, is the other piece of information added to an instruction which has detected the occurrence of an exception in the first instruction execution part 400.

SECOND EXCEPTION DETECTION SIGNAL, indicated by the reference numeral 513, is a signal for instructions to be executed in the second instruction execution part 500. FIRST INFORMATION, indicated by the reference numeral 514, is one piece of information added to an instruction which has detected the occurrence of an exception in the second instruction execution part 500. SECOND INFORMATION, indicated by the reference numeral 515, is the other piece of information added to an instruction which has detected the occurrence of an exception in the second instruction execution part 500.

Figure 4A:
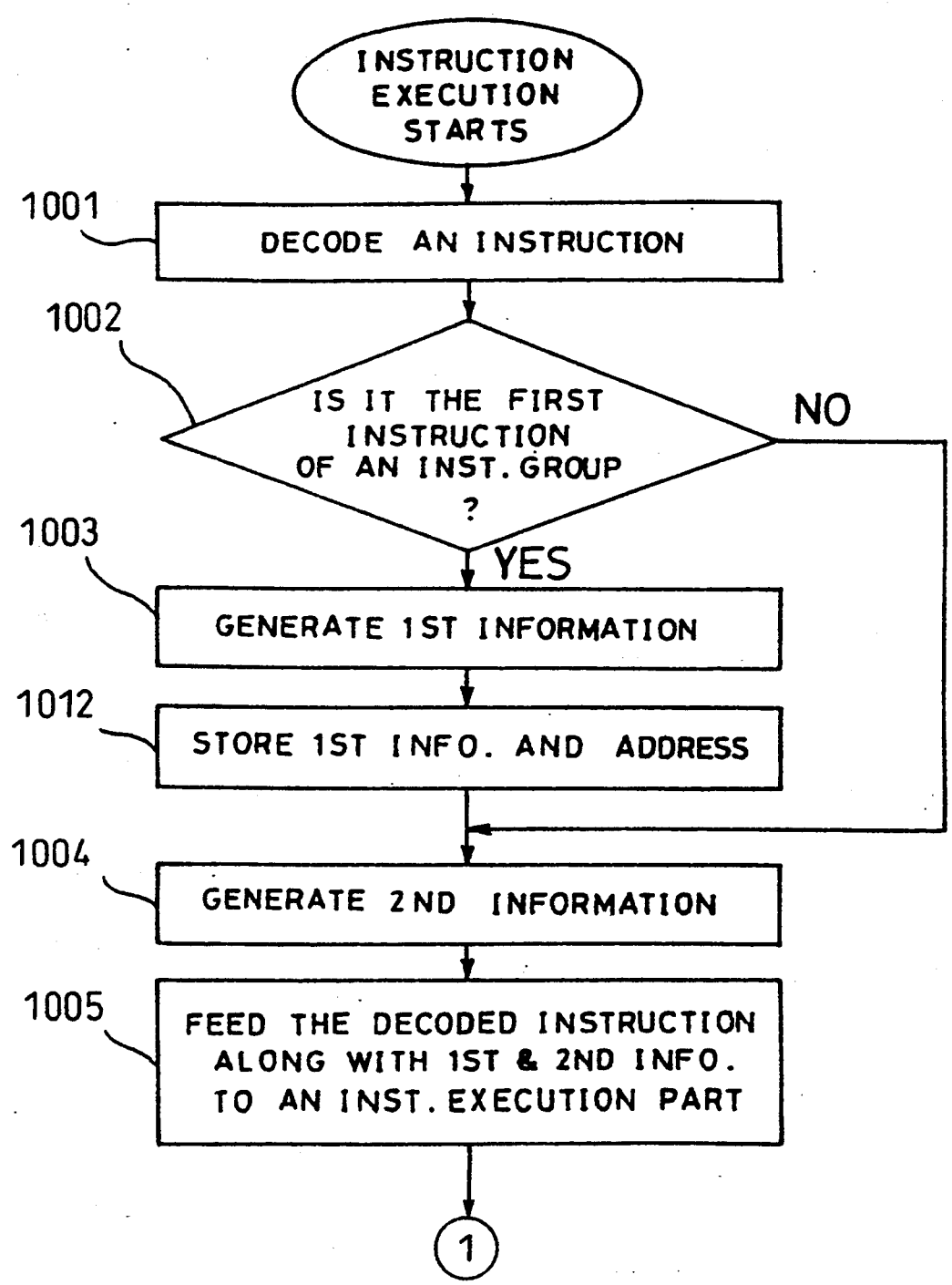
FIGS. 4(A) and 4(B) illustrate a flow chart showing how the data processor of the second embodiment of the invention saves an instruction address when an exception occurs.
Figure 4B:
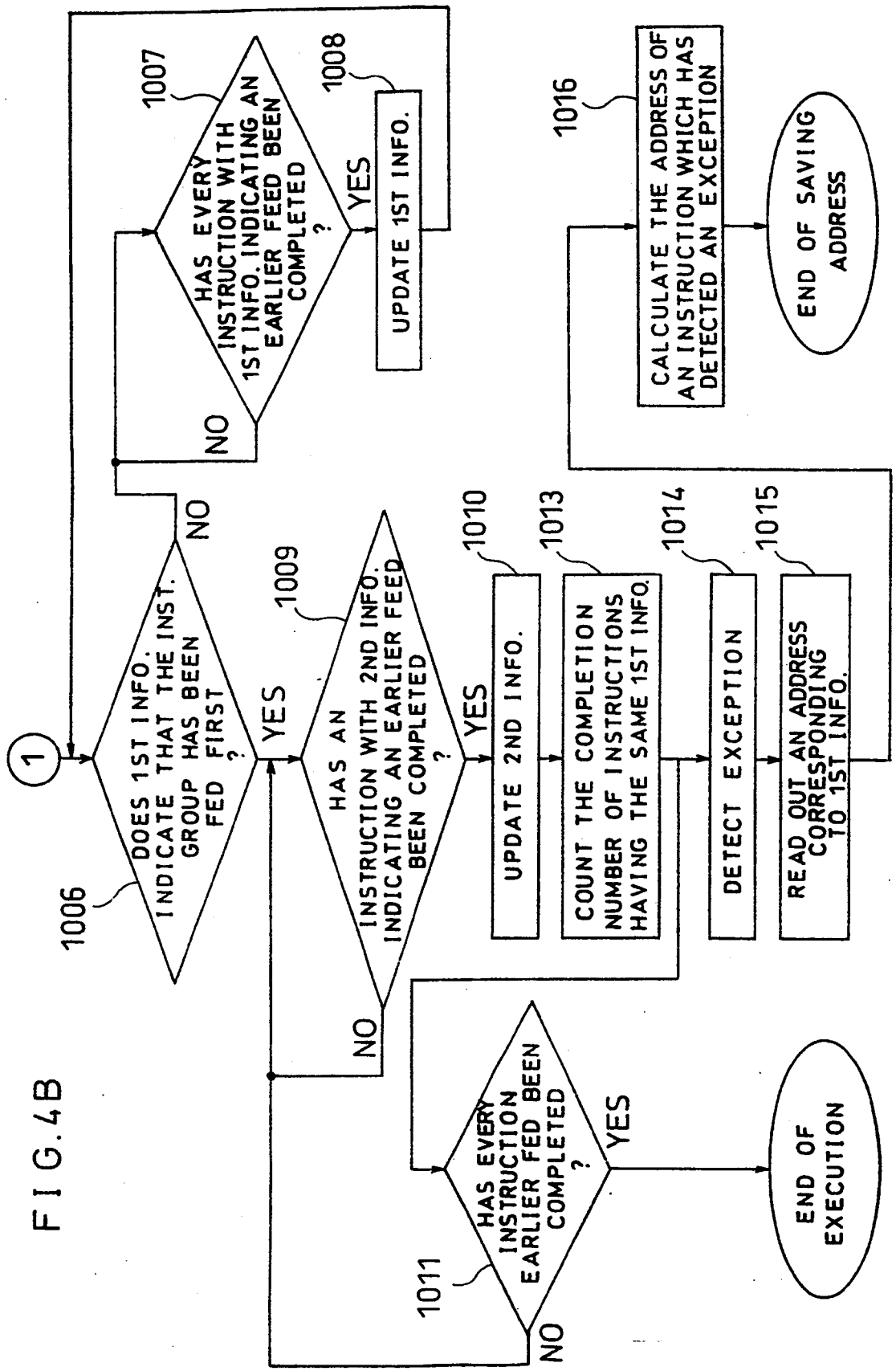
Figure 5A:
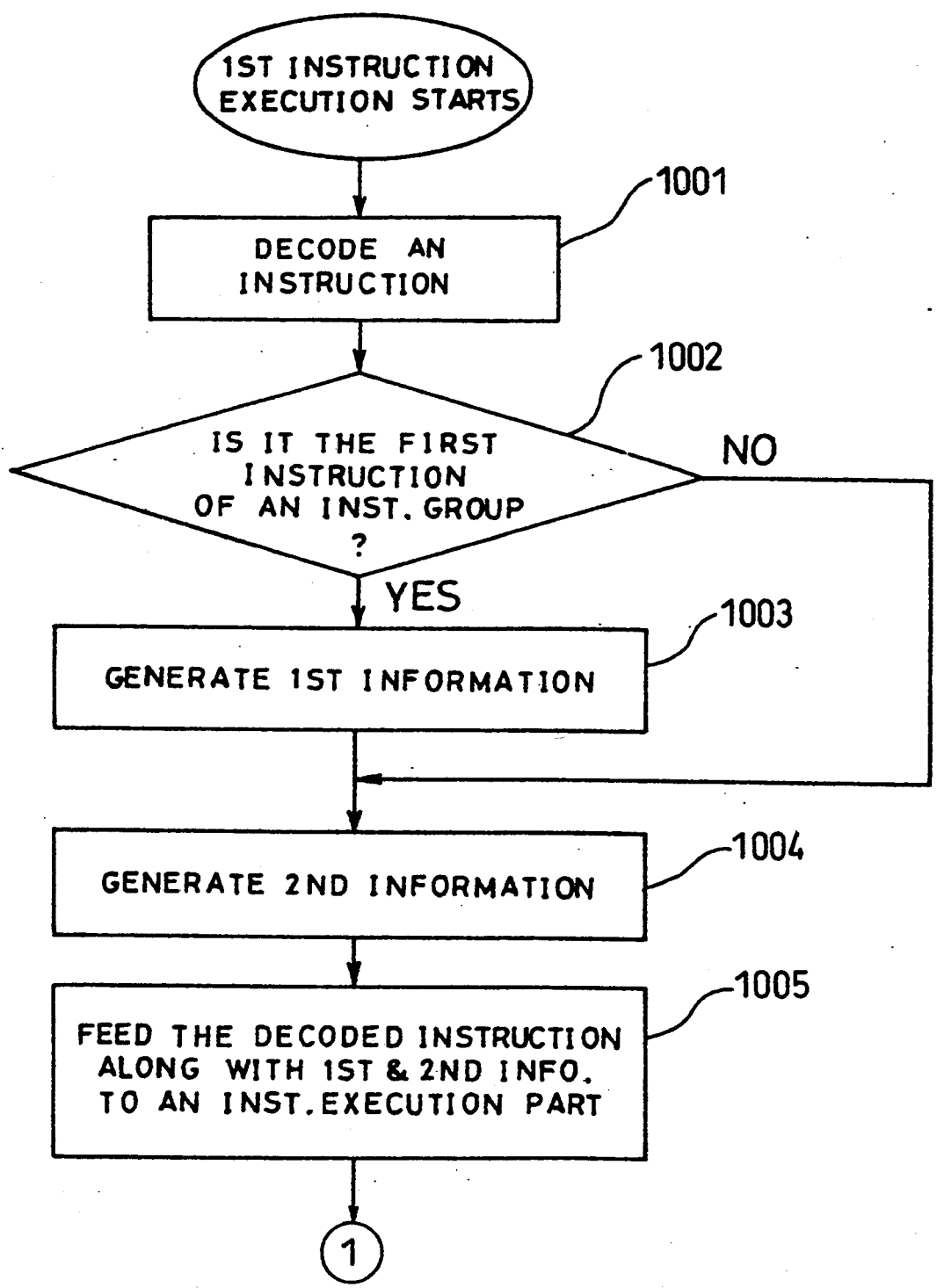
FIGS. 5(A) and 5(B) illustrate a first flow chart showing how the data processor of the third embodiment of the invention saves an instruction address when an exception occurs.
Figure 5B:
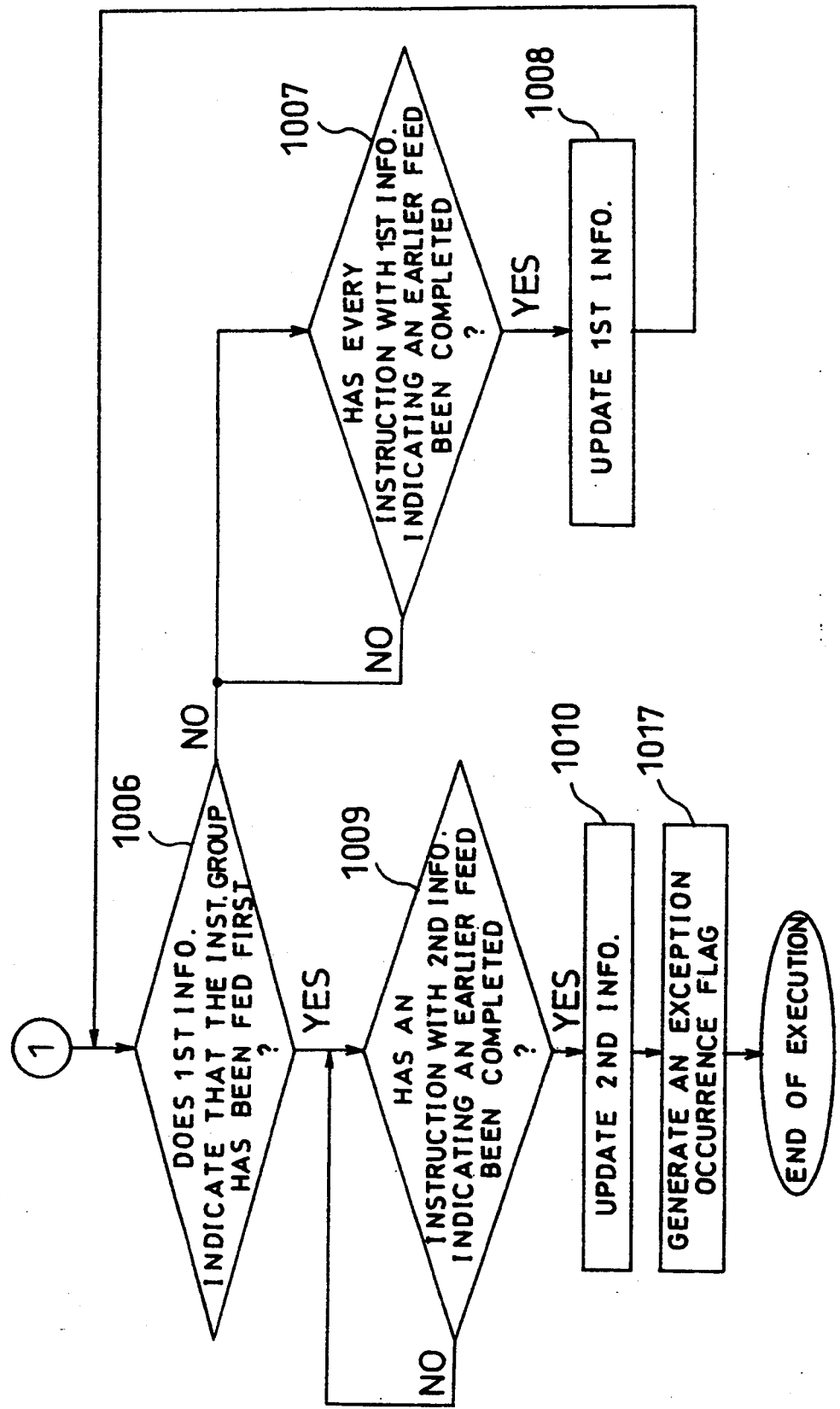
Figure 6A:
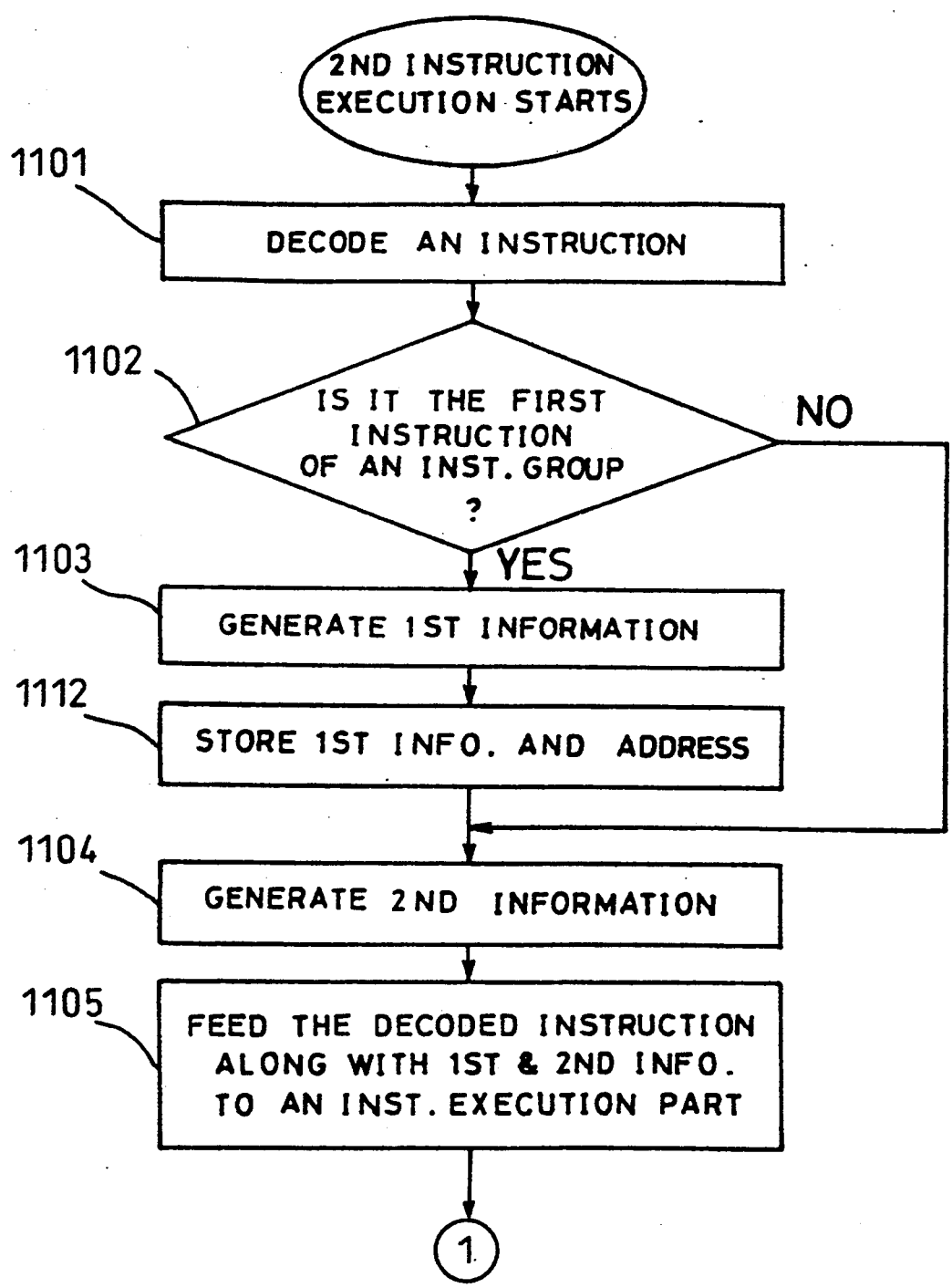
FIGS. 6(A) and 6(B) illustrate a second flow chart showing how the data processor of the third embodiment of the invention saves an instruction address when an exception occurs.
Figure 6B:
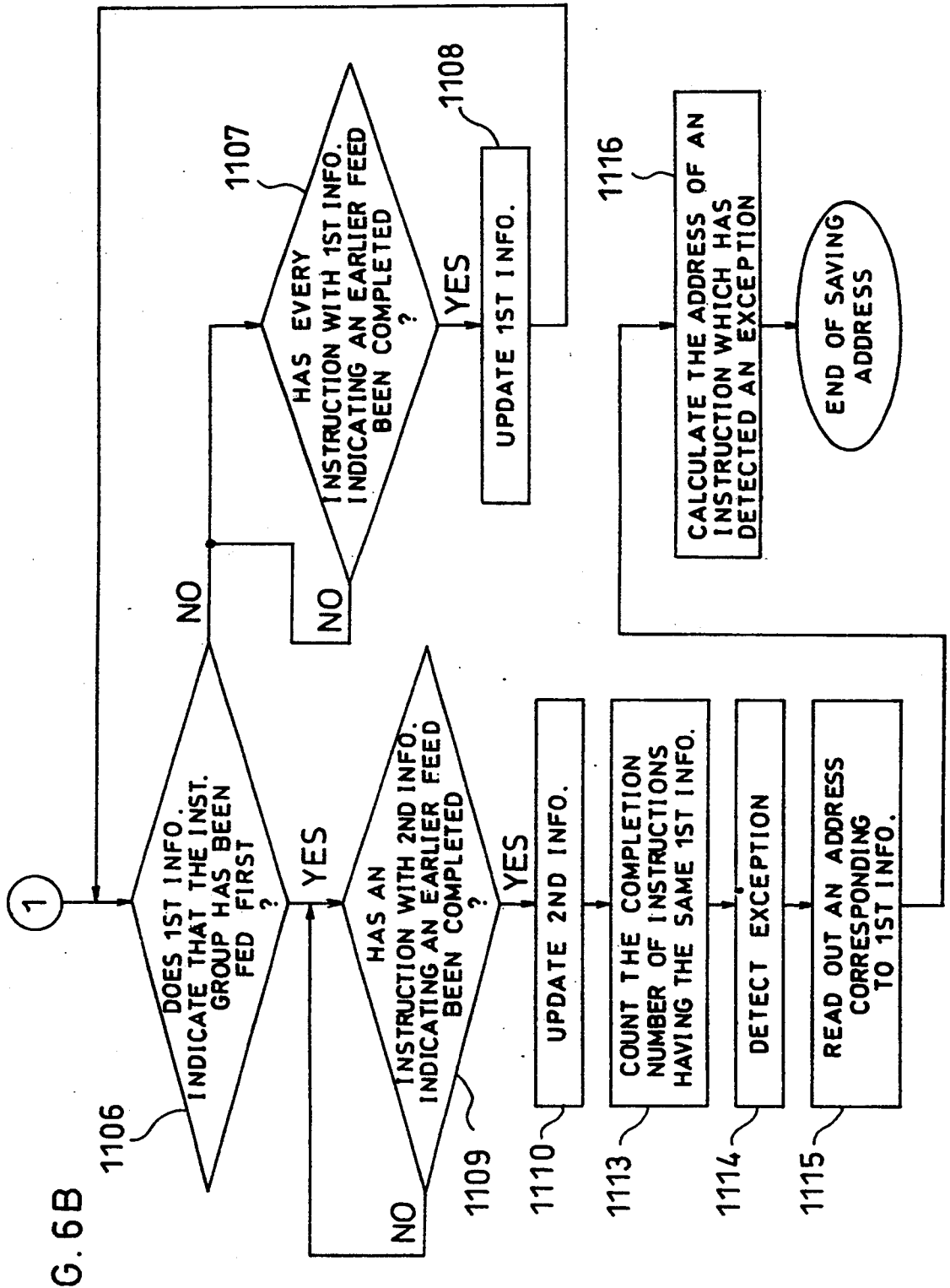

In accordance with the above-described data processor, if an instruction fed last but one (that is, the instruction fed just prior to DECODED INSTRUCTION) is found to be a control transfer instruction, in other words, if such two instructions are not stored at successive instruction addresses, this causes the address control part 600 to store FIRST INFORMATION 311 together with ADDRESS 213 of DECODED INSTRUCTION (STEP 1012 of FIG. 4(A)). SECOND INFORMATION is updated every time the execution of an instruction having SECOND INFORMATION indicating a first instruction is completed (STEP 1010), and at the same time the number of instruction execution completion in a group of instructions (i.e., the first group of instructions to which the instruction whose execution is completed belongs) is counted (STEP 1013).

If there occurs an exception when executing a certain instruction, and it is such an instruction itself that has detected such an exception (STEP 1014), the operation to save the address of the instruction that has caused the exception and detected it begins so that the execution of the instruction can resume after exceptional handling. More specifically, based on FIRST INFORMATION that is added to an instruction which is a cause of the occurrence of an exception, its address is read out if it is a first instruction of its assigned group of instructions, otherwise the address of a first instruction of the same group of instructions is read out (STEP 1015). A required instruction address is read out based on FIRST INFORMATION. With using the address thus read out, SECOND INFORMATION of the instruction that has caused the exception, and the number of instruction execution completion in a group of instructions to which the instruction belongs, the address, to be saved, of the instruction that has caused the exception can be derived (STEP 1016).

An example is given below to show how an instruction address is saved at the time of the occurrence of an exception in accordance with the above. As in the first embodiment, six instructions are fed from the instruction feed part 100 in the following order. Only 4-byte fixed-length instructions shall be dealt with here.

C1 →A1 →B1 →C2 →A2 →B2 →

In the first place, INSTRUCTIONS C1 through C2 are fed to the respective instruction execution parts to be processed. Information, comprised of FIRST and SECOND INFORMATION and added to these four instructions, is shown in STATE 1 of TABLE. If the occurrence of an exception is detected when executing THIRD INSTRUCTION B1 in the second instruction execution part 500, and it is THIRD INSTRUCTION B1 itself that has detected the exception, the executions of FIRST and SECOND INSTRUCTIONS C1 and A1, fed earlier than THIRD INSTRUCTION B1 from the instruction feed part 100, will continue until they are completed. The operation of saving the address of THIRD INSTRUCTION B1 starts so that the instruction execution can resume starting with THIRD INSTRUCTION B1.

More specifically, if an exception is detected in THIRD INSTRUCTION B1, this asserts SECOND EXCEPTION DETECTION SIGNAL 513 whereby the fact that such an exception is taking place in the second instruction execution part 500 is communicated to both the synchronous information control part 300 and the address control part 600. At the same time, the second instruction execution part 500 feeds FIRST and SECOND INFORMATION 514 and 515 that are added to THIRD INSTRUCTION B1, to both the synchronous information control part 300 and the address control part 600.

Based on FIRST INFORMATION 514 added to THIRD INSTRUCTION B1 that has detected the occurrence of an exception, the synchronous information control part 300 prepares for the number of instruction execution completion for instructions having the same FIRST INFORMATION. The synchronous information control part 300 calculates an address correction value by the number of instruction execution completion thus prepared and SECOND INFORMATION 515 added to THIRD INSTRUCTION B1. Then FIRST INFORMATION 514, added to INSTRUCTION B1, indicates that of all instructions under execution in both instruction execution parts, THIRD INSTRUCTION B1 belongs to a second group of instructions, whereas SECOND INFORMATION 515 indicates that THIRD INSTRUCTION B1 is a second one from SECOND INSTRUCTION A1 of the second group of instructions. It is learned from FIRST INFORMATION 514 that THIRD INSTRUCTION B1 is neither a first instruction of a first group of instructions (i.e., FIRST INSTRUCTION C1 in this case) nor the following instruction fed after a first instruction of a first group of instructions (until a first instruction of a next group of instructions is fed). The synchronous information control part 300 generates an address correction value, four for INSTRUCTUION B1, since the number of instruction execution completion for instructions having the same FIRST INFORMATION is zero and SECOND INFORMATION indicates a second instruction.

Based on FIRST INFORMATION 514 that is added to THIRD INSTRUCTION B1 that has detected the occurrence of an exception, the address control part 600 reads an instruction address stored together with FIRST INFORMATION 514 (i.e., the address of SECOND INSTRUCTION A1 with FIRST INFORMATION indicating the second group of instructions), and derives the address, to be saved, of THIRD INSTRUCTION B1 that has detected the occurrence of an exception, by adding the foregoing address correction value, 4 to the address thus read.

In accordance with this embodiment, it is not required that each one of instructions under execution in both the first instruction execution part 400 and the second instruction execution part 500 individually has an address which becomes a necessity when an exception occurs. The address control part 600 holds only the addresses of first instructions of each group of instructions. SECOND INFORMATION is assigned, which indicates the order of feed of instructions in a group of instructions. The number of instruction execution completion for instructions of a first group of instructions is counted. Thus, an instruction address, to be saved when an exception is detected, can be derived by means of the above-described simple way. The configuration of a data processor can considerably be simplified and the efficiency of processing is improved.

Additionally, variable-length instructions may be dealt with by storing the word length of each one of instructions, besides the address of a first instruction of each group of instructions, in the address control part 600.

THIRD EMBODIMENT

A method of saving an instruction address to cope with the occurrence of an exception is described now by reference to FIGS. 5(A) and FIGS. 5(B) and FIGS. 6(A) and 6(B), and further to FIG. 3 used for describing the second embodiment. Being a variation of the second embodiment, this embodiment is described focusing on the differences between the two embodiments.

If an instruction execution part is used for floating-point operations, it is not necessary to resume the execution of an instruction that has caused an exception such as over-flow In view of this, in this embodiment using the data processor with the configuration of FIG. 3, an instruction does not detect an exception even though such an exception has occurred in executing it. The exception is detected by another following instruction of the same type that is executed in the same instruction execution part. A flag (i.e., the exception occurrence flag) corresponding to an exception occurred is generated, which is stored in the instruction execution part in which an instruction (the cause of the occurrence of an exception) has been executed (STEP 1017 of FIG. 5(B). In this case, what is saved is not the address of one instruction that has caused an exception but the address of the other which has actually detected such an exception based on the exception occurrence flag set (STEP 1114).

An example is given below to detail the above address saving. Like the first and second embodiments, six instructions are fed from the instruction feed part 100 in the following order. Only instructions with a 4-byte fixed-length shall be dealt with here.

C1 →A1 →B1 →C2 →A2 →B2

Of these six instructions, SECOND and FIFTH INSTRUCTIONS A1 and A2 are instructions of a type that do not detect their own exceptions so that such exceptions are to be detected by following instructions to be executed in the same instruction execution part that INSTRUCTIONS A1 and A2 are executed. To sum up, an execution taking place in executing SECOND INSTRUCTION A1 is detected by FIFTH INSTRUCTION A2 to be executed in the same instruction execution part that SECOND INSTRUCTION A1 has been executed.

INSTRUCTIONS C1 through C2, four instructions altogether are fed, first two to the first instruction execution part 400, and last two to the second instruction execution part 500 to be processed. Respective information, each comprised of FIRST and SECOND INFORMATION and added to these four instructions, is shown in STATE 1 of TABLE. If the occurrence of an exception is detected when executing SECOND INSTRUCTION A1 in the first instruction execution part 400, the contents of such an exception is written to an exception occurrence flag in the first instruction execution part 400, however, the executions of INSTRUCTIONS C1, B1 and C2 continue. This does not assert FIRST EXCEPTION DETECTION SIGNAL 413, since the detection of the occurrence of an exception is not carried out.

Then, like the first embodiment, the execution of FIRST INSTRUCTION C1 is completed (see STATE 2 of TABLE), before FIFTH and SIXTH INSTRUCTIONS A2 and B2 are fed (STATE 3). If SECOND INSTRUCTION A1, which has caused the exception, is in its execution completion state when SECOND INSTRUCTION A1 is fed to the first instruction execution part 400, information, comprised of FIRST and SECOND INFORMATION and respectively added to INSTRUCTIONS B1, C2 and A2 is as follows.

FIRST INFORMATION of THIRD INSTRUCTION B1 indicates that of all instructions under execution in both of the instruction execution parts, THIRD INSTRUCTION B1 belongs to a first group of instructions, while on the other hand SECOND INFORMATION thereof indicates that THIRD INSTRUCTION B1 and a first instruction of the first group of instructions.

FIRST INFORMATION of FOURTH INSTRUCTION C2 indicates that of all instructions under execution in both of the instruction execution parts FOURTH INSTRUCTION C2 belongs to the first group of instructions, while on the other hand SECOND INFORMATION thereof indicates that FOURTH INSTRUCTION C2 is a second instruction of the first group of instructions.

FIRST INFORMATION of FIFTH INSTRUCTION A2 indicates that of all instructions under execution in both of the instruction execution parts, FIFTH INSTRUCTION A2 belongs to a second group of instructions, while on the other hand SECOND INFORMATION thereof indicates that FIFTH INSTRUCTION A2 is a first instruction of the second group of instructions.

Based on the contents of the exception occurrence flag, FIFTH INSTRUCTION A2 under execution in the first instruction execution part 400 detects the exception of SECOND INSTRUCTION A1. The executions of INSTRUCTIONS B1 and C2, fed earlier than FIFTH INSTRUCTION A2 from the instruction feed part 100, continue for completion. The operation of saving the address of FIFTH INSTRUCTION A2 starts so that the instruction execution can resume starting with FIFTH INSTRUCTION A2.

More specifically, if an exception is detected by FIFTH INSTRUCTION A2, this will assert FIRST EXCEPTION DETECTION SIGNAL 413 whereby the fact that the occurrence of an exception in the first instruction execution part 400 is communicated to both the synchronous information control part 300 and the address control part 600. At the same time, the first instruction execution part 400 feeds FIRST and SEC- OND INFORMATION 414 and 415 that are added to FIFTH INSTRUCTION A2 that has detected the occurrence of an exception, to both the synchronous information control part 300 and the address control part 600.

Based on FIRST INFORMATION 414 added to FIFTH INSTRUCTION A2 that has detected the occurrence of an exception, the synchronous information control part 300 prepares for the number of instruction execution completion for instructions of the same group of instructions as FIFTH INSTRUCTION A2. The information control part 300 calculates an address correction value by the number of instruction execution completion thus prepared and SECOND INFORMATION 415 added to FIFTH INSTRUCTION A2 that has detected the exception. Then FIRST INFORMATION 414, added to INSTRUCTION A2, indicates that of all instructions under execution in both of the first instruction execution part 400 and the second instruction execution part 500, FIFTH INSTRUCTION A2 belongs to a second group of instructions, whereas SECOND INFORMATION 415 thereof indicates that FIFTH INSTRUCTION A2 is a first instruction of the second group of instructions. It is learned from FIRST INFORMATION 414 that FIFTH INSTRUCTION A2 is neither a first instruction of a first group of instructions (the execution of SECOND INSTRUCTION A1 has already been completed here) nor the following instruction fed after a first instruction of a first group of instructions (until a first instruction of a next group of instructions is fed). The synchronous information control part 300 generates an address correction value, zero for INSTRUCTION A2, since the number of instruction execution completion for instructions having the same FIRST INFORMATION is zero, and SECOND INFORMATION indicates a fist instruction.

Based on FIRST INFORMATION 414 that is added to FIFTH INSTRUCTION A2 that has detected exception occurrence, the address control part 600 reads an instruction address stored together with the same FIRST INFORMATION (that is, the address of FIFTH INSTRUCTION A2 with FIRST INFORMATION indicating a second group of instructions,) and derives the address, to be saved, of FIFTH INSTRUCTION A2 by adding the foregoing address correction value, zero to the address read.

An example case of this embodiment may be specified in which the re-execution of an instruction that has caused an exception is not performed by hardware, as in the case of the occurrence of an exception, but it is done in a program for exceptional handling (hardware makes the conversion of the type of an instruction to another for emulation by software). Also in such a case, it is possible to derive an instruction address to be saved at the time of the occurrence of an exception. The configuration of a data processor can considerably be simplified, and the efficiency of processing is improved.

Additionally, like the second embodiment, variable-length instructions may be dealt with.

FOURTH EMBODIMENT

Figure 7:
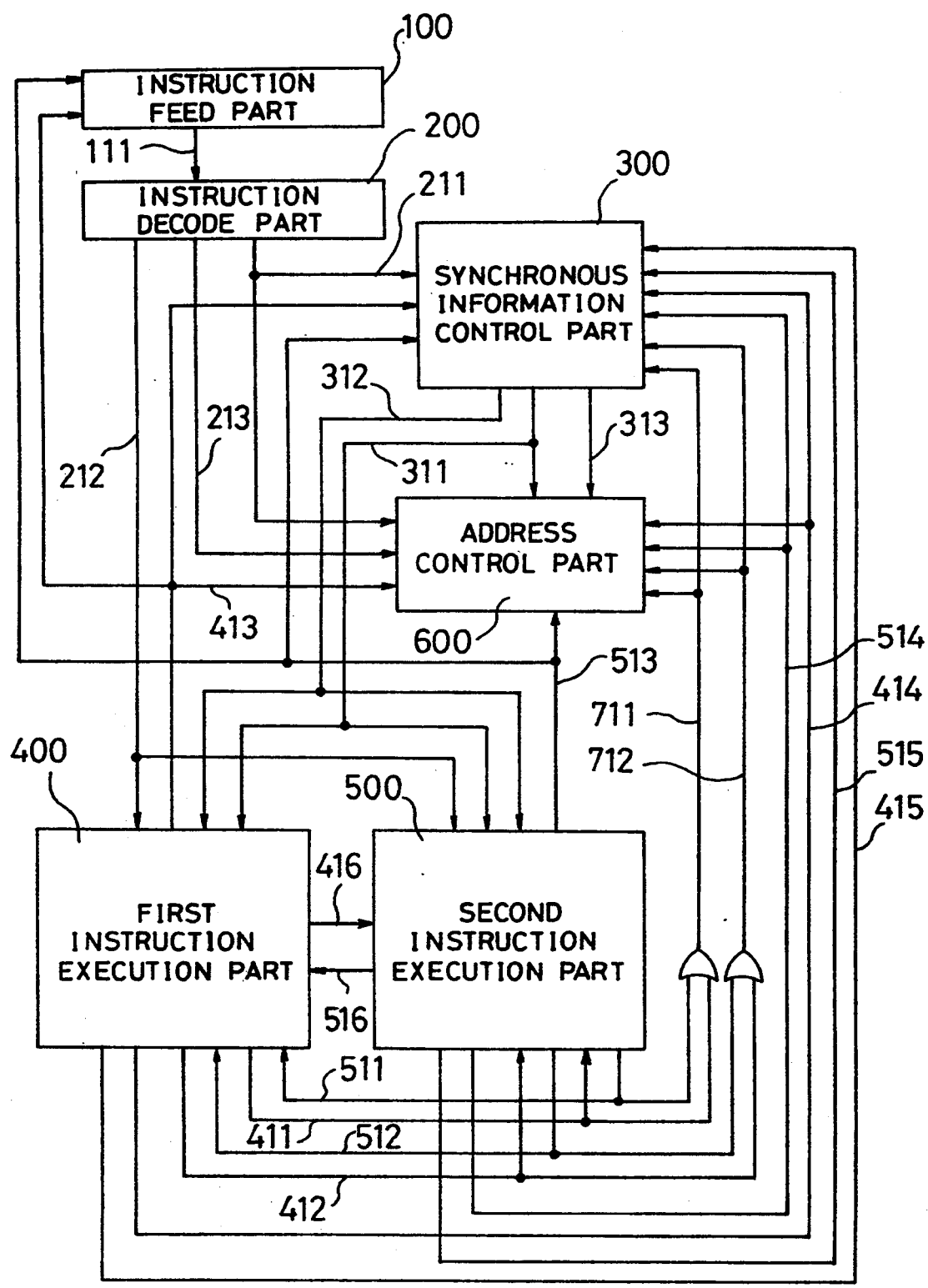
FIG. 7 is a block diagram showing the organization of a data processor of a fourth embodiment of the invention.
Figure 8A:
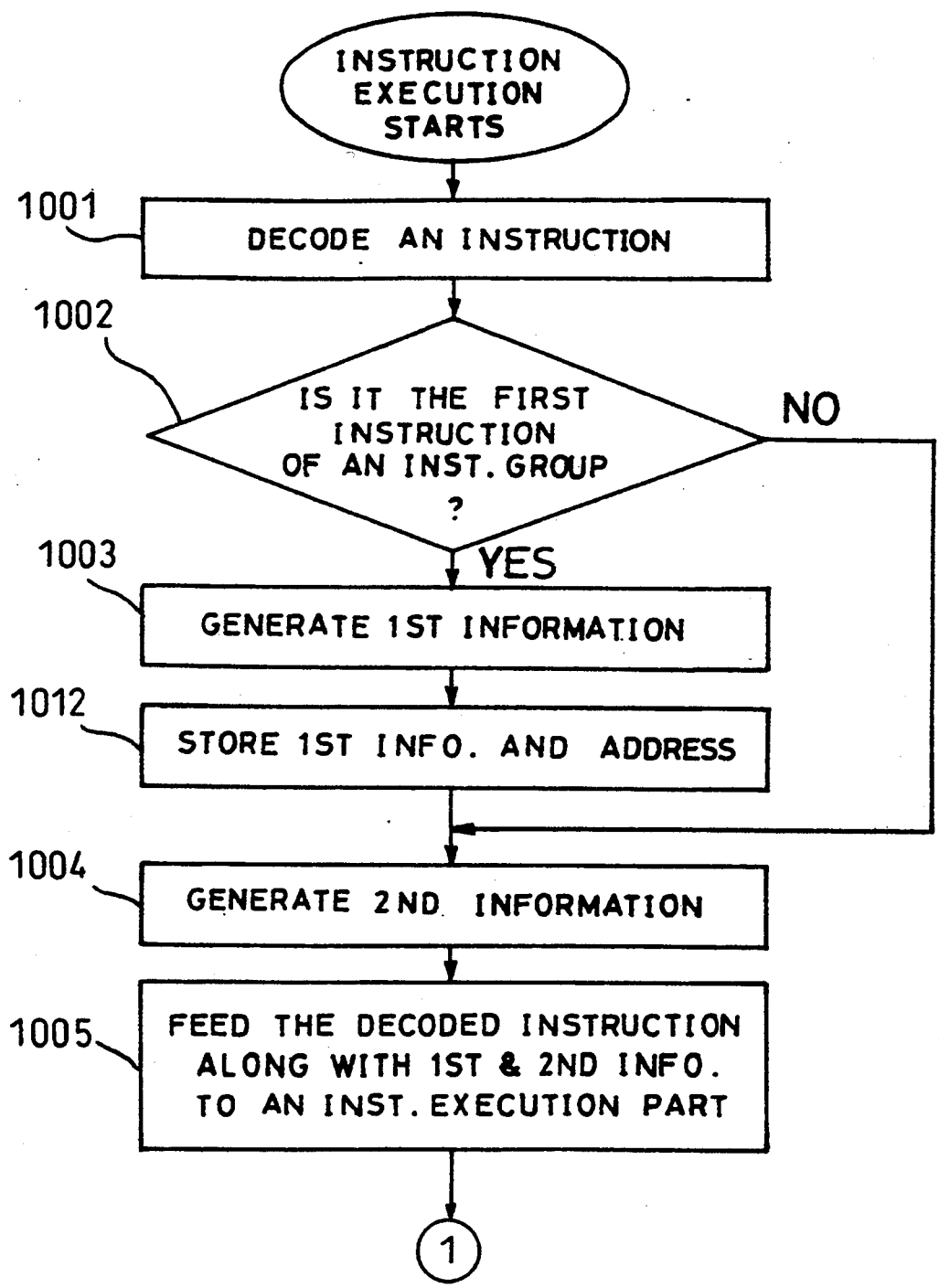
FIGS. 8(A) and 8(B) illustrate a flow chart showing how the data processor of the fourth embodiment of the invention invalidates instruction processing when an exception occurs.

A fourth embodiment of the present invention is now described, which discloses a data processor that further performs the function of invalidating instruction processing, besides the functions of synchronizing instruction executions and of saving an instruction address to cope with the occurrence of an exception, which are achieved by the data processors by the foregoing first and second embodiments). FIG. 7 contains the contents of FIG. 3, and FIGS. 8(A) and 8(B) contain the contents of FIGS. 4(A) and 4(B). Accordingly, this embodiment will be described below by pointing up additional features.

For a data processor, shown in FIG. 7, the instruction feed part 100 is supplied with FIRST EXCEPTION DETECTION SIGNAL 413 for instructions to be excuted in the first instruction execution part 400, and with SECOND EXCEPTION DETECTION SIGNAL 513 for instructions to be executed in the second instruction execution part 500. FIRST INVALIDATION DEMAND SIGNAL 416 is fed to the second instruction execution part 500, which demands the invalidation of every instruction processing under execution in both instruction execution parts, based on an exception detected in the first instruction execution part 400. SECOND INVALIDATION DEMAND SIGNAL 516 is fed to the first instruction execution part 400, which demands the invalidation of every instruction processing under execution in both instruction execution parts, based on an exception detected in the second instruction execution part 500. The instruction feed part 100 performs the function of stopping feeding next instructions in response to FIRST and SECOND EXCEPTION DETECTION SIGNALS 413 and 513. Each one of the instruction execution parts performs the function of invalidating the processing of all instructions under execution, based on FIRST and SECOND INFORMATION added to an instruction that has detected the occurrence of an exception as well as on FIRST and SECOND INVALIDATION DEMAND SIGNALS 416 and 516.

Figure 8B:
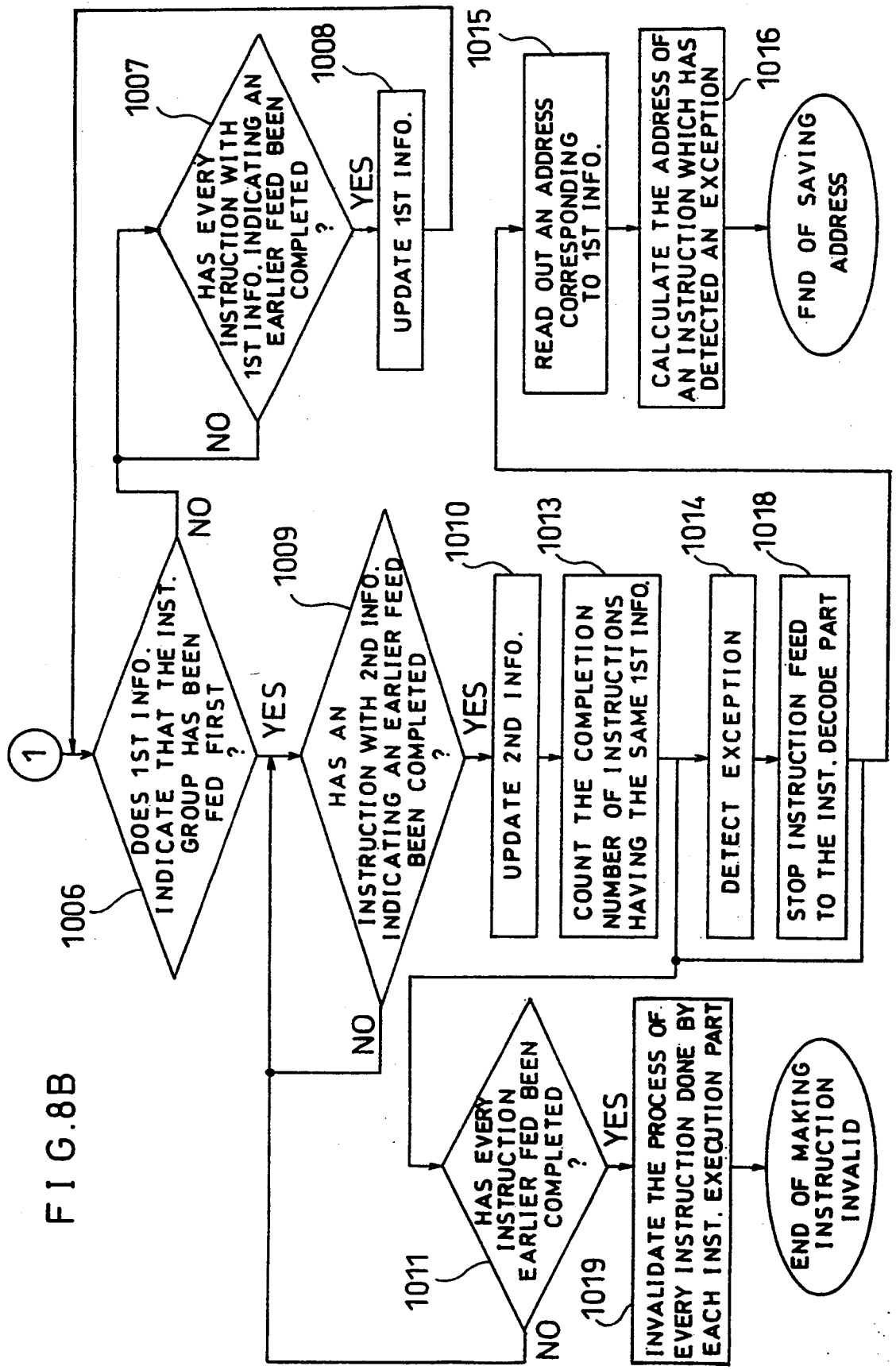
Figure 9A:
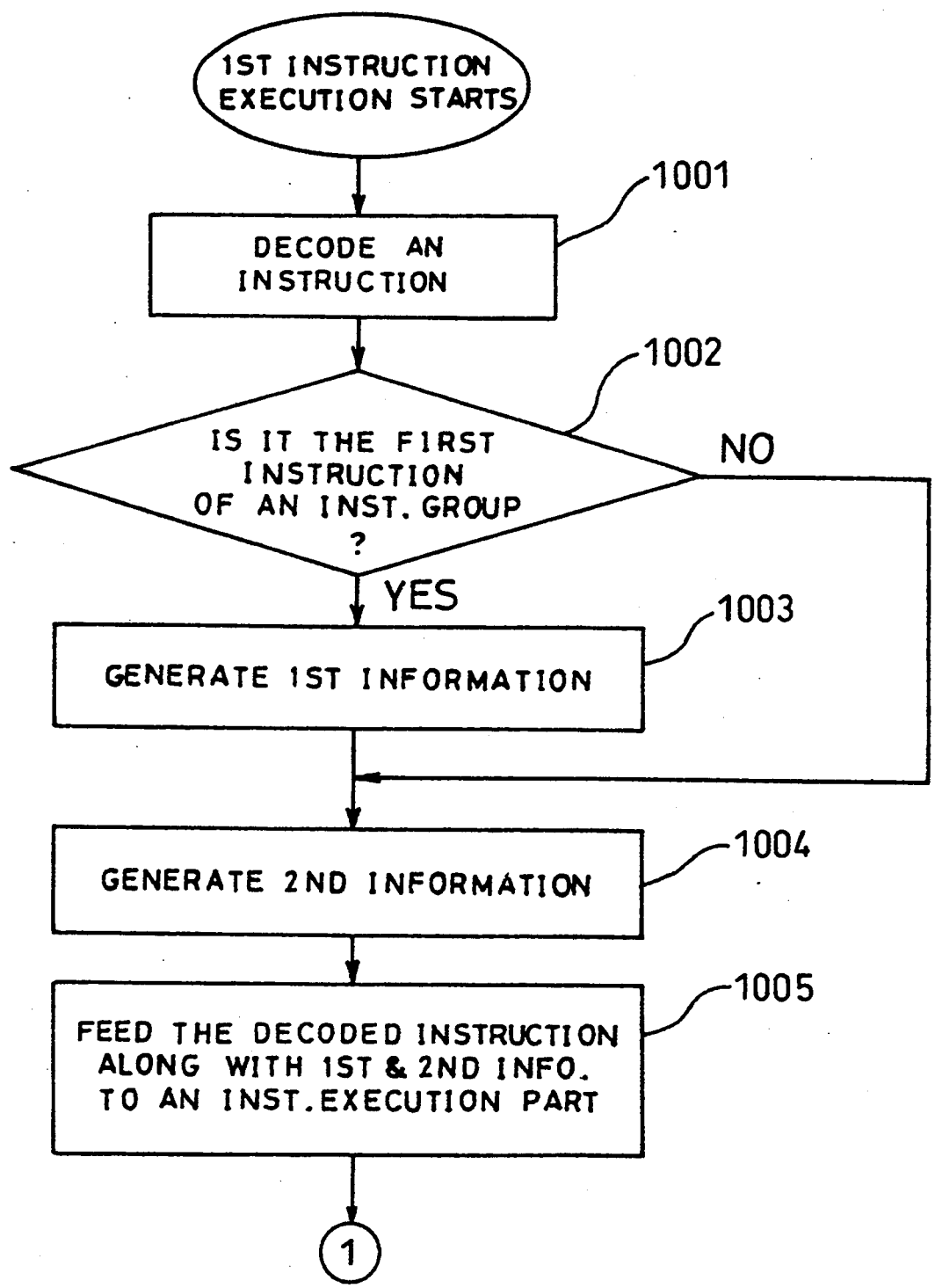
Figure 10A:
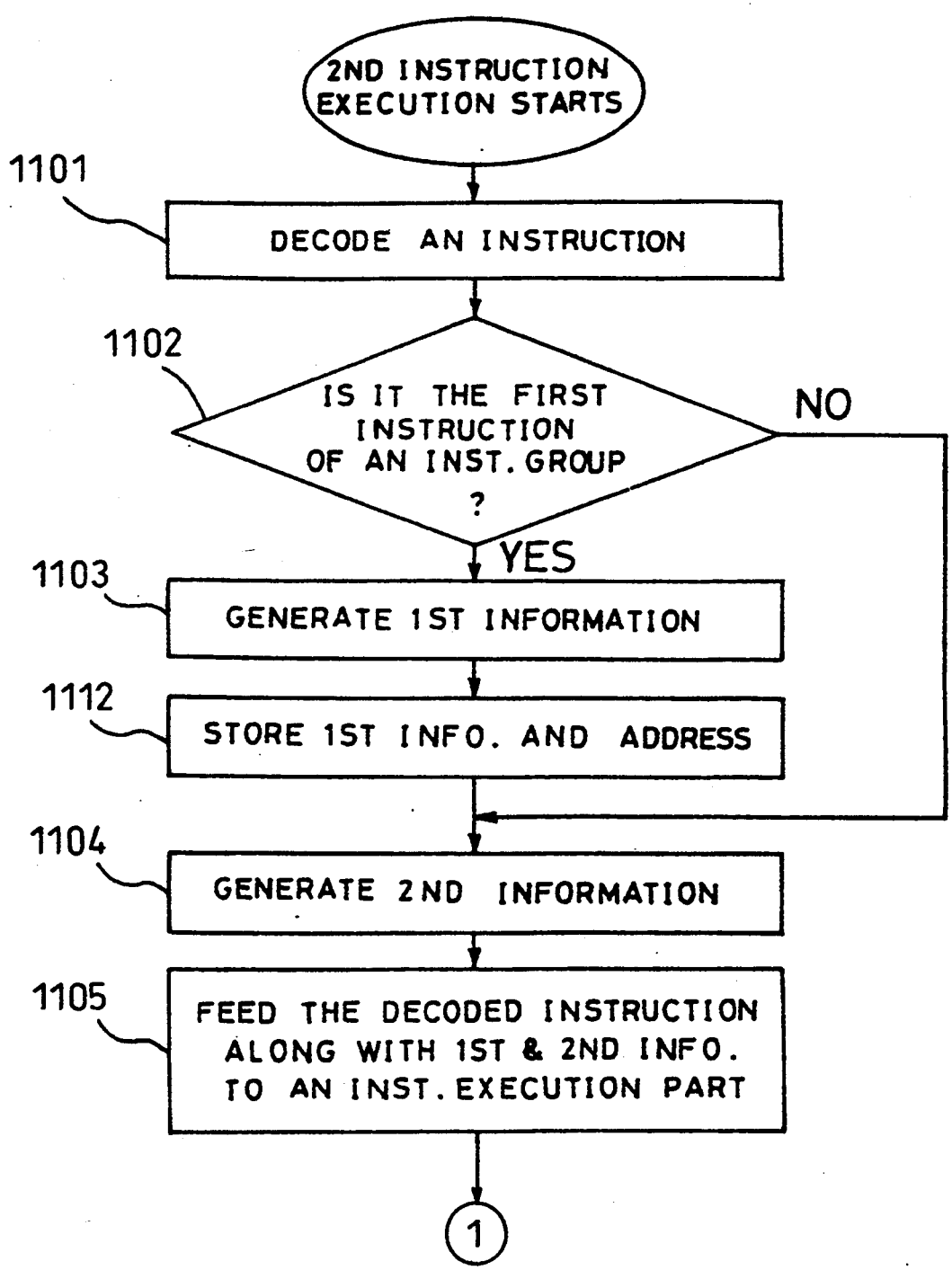
FIGS. 10(A) and 10(B) illustrate a second flow chart showing how the data processor of the fourth embodiment of the invention invalidates instruction processing in a modified way when an exception occurs.
Figure 10B:
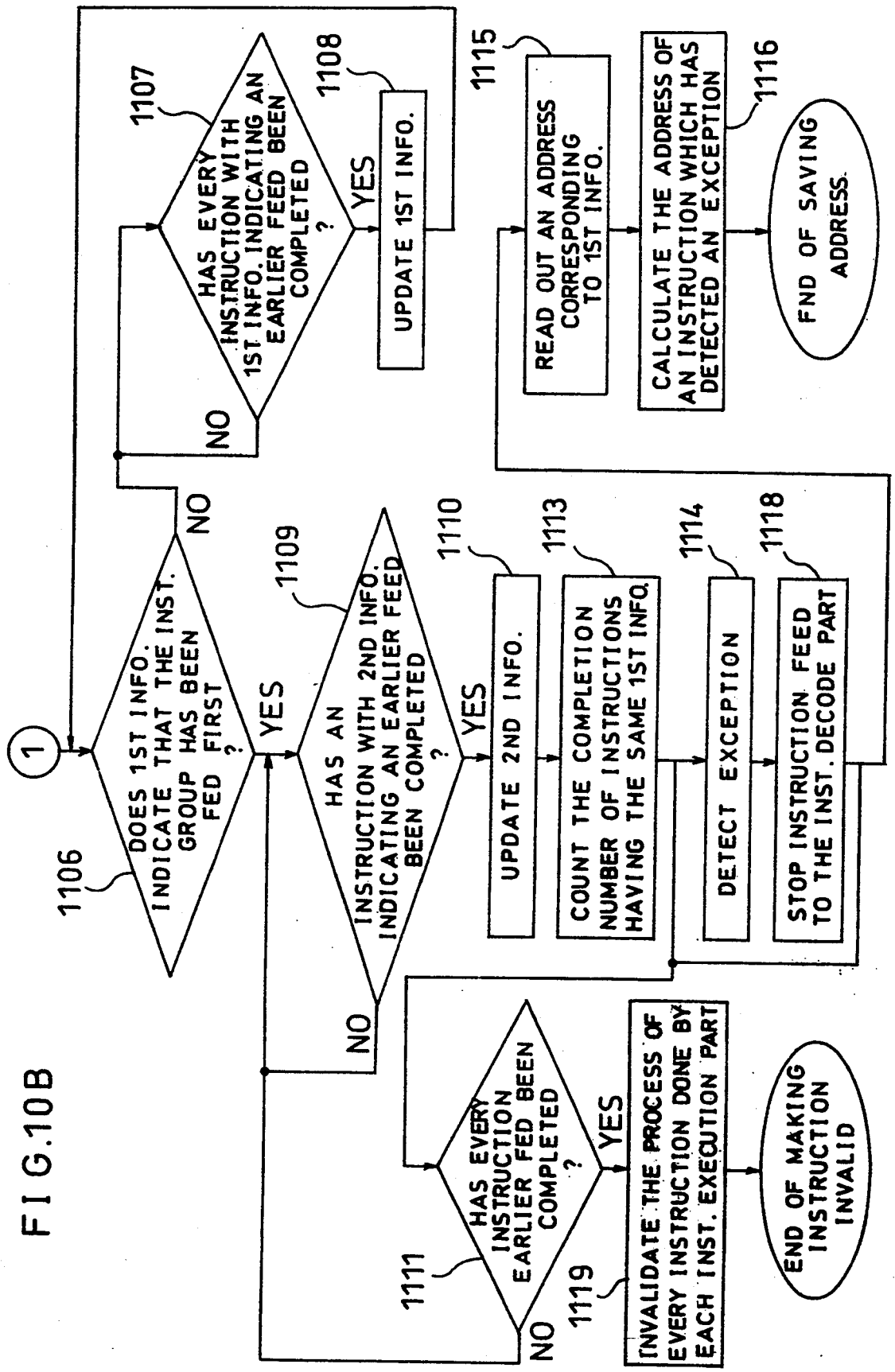

In the data processor with the above-described configuration, if a certain instruction is found to have caused an exception, and such an instruction itself has detected the occurrence of an exception, this generates an exception detection flag that signals the occurrence of an exception (STEP 1014 of FIG. 8(B)). Then the instruction feed part 100 stops feeding next instructions (STEP 1018). In order to resume the execution of the instruction, which is a cause of the occurrence of an exception and is one that has detected the exception, after exceptional handling, the operation of saving the address of the instruction starts (STEPS 1015 and 1016). Meanwhile, the executions of the preceding instructions, fed earlier than the instruction in question, continue. When their executions are all completed (STEP 1011), in other words, when information, comprised of FIRST and SECOND INFORMATION, of the instruction in question indicates a first instruction of a first group of instructions, the processing of all of the following instructions (that is, the instructions fed after the instruction that has detected the exception by itself) is invalidated in both instruction execution parts (STEP 1019).

An example is given below to detail the foregoing invalidation of instruction processing at the time of the occurrence of an exception. Likewise, six instructions are fed from the instruction feed part 100 in the following order.

C1 →A1 →B1 →C2 →A2 →B2

In the first place, INSTRUCTIONS C1 through C2 are fed to the respective instruction execution parts 400 and 500 to be processed. Information, comprised of FIRST and SECOND INFORMATION and added to these four instructions, is shown in STATE 1 of TABLE. If the occurrence of an exception is detected when executing THIRD INSTRUCTION B1 in the second instruction execution part 500 as in the second embodiment, and it is THIRD INSTRUCTION B1 itself that has detected the occurrence of an exception, the executions of INSTRUCTIONS C1 and A1, fed earlier than THIRD INSTRUCTION B1 from the instruction feed part 100, will continue until they are completed. The operation of saving the address of THIRD INSTRUCTION B1 and then invalidating the processing of the following instructions (i.e., the instructions fed after THIRD INSTRUCTION B1) in both instruction execution parts starts so that the instruction execution can resume starting with THIRD INSTRUCTION B1 after finishing exceptional handling.

More specifically, if an exception is detected when executing THIRD INSTRUCTION B1, this asserts SECOND EXCEPTION DETECTION SIGNAL 513 whereby the fact that such an exception is taking place in the second instruction execution part 500 is communicated to the instruction feed part 100, the synchronous information control part 300 and the address control part 600. THIRD INSTRUCTION B1 which has detected the occurrence of an exception keeps having an exception detection flag that signals the detection of the occurrence of an exception until the executions of the preceding INSTRUCTIONS C1 and A1 are completed. Receiving information that an exception has been detected, the instruction feed part 100 first stops feeding next instructions, INSTRUCTIONS A2 and B2. Thereafter, as shown in the second embodiment, while deriving the address of THIRD INSTRUCTION B1 so that it can be saved, the executions of the preceding instructions, INSTRUCTIONS C1 and A1 continue. The following describes the processing of INSTRUCTIONS C1 and A1 to be continued, and further shows how the processing of the following instructions fed after THIRD INSTRUCTION B1 is invalidated.

The completion of the execution of FIRST INSTRUCTION C1 in the first instruction execution part 400 asserts, or brings both FIRST IECS 411 and SECOND IECS 412 into their active states, since FIRST INSTRUCTION C1 has FIRST INFORMATION indicating that of all instructions under execution in both instruction execution parts, FIRST INSTRUCTION C1 belongs to a first group of instructions and SECOND INFORMATION indicating that FIRST INSTRUCTION C1 is a first (and last) instruction thereof. Due to this assertion, respective FIRST INFORMATION of SECOND INSTRUCTION A1 under execution in the first instruction execution part 400, and INSTRUCTIONS B1 and C2 under execution in the second instruction execution part 500 is updated (see STATE 2 of TABLE for respective FIRST INFORMATION of INSTRUCTIONS A1, B1 and C2).

Since the feed of INSTRUCTIONS A2 and B2 from the instruction feed part 100 is brought to a stop, this allows the execution of SECOND INSTRUCTION A1 under execution in the first instruction execution part 400 to be completed. The completion of the execution of SECOND INSTRUCTION A1 asserts SECOND IECS 412, since SECOND INSTRUCTION A1 has FIRST INFORMATION indicating a first group of instructions and SECOND INFORMATION indicating a first instruction thereof. Due to this assertion, respective SECOND INFORMATION of INSTRUCTIONS B1 and C2 both under execution in the second instruction execution part 500 is updated (see STATE 4 of TABLE). Note that INSTRUCTIONS A2 and B2 are nonexistent in any one of the instruction execution parts.

Due to the completion of the execution of SECOND INSTRUCTION A1, of all instructions under execution in both instruction execution parts THIRD INSTRUCTION B1 that has detected the occurrence of an exception becomes a first instruction of a first group of instructions. This asserts SECOND INVALIDATION DEMAND SIGNAL 516, based on THIRD INSTRUCTION B1's exception detection flag. The processing of both INSTRUCTIONS B1 and C2 is therefore invalidated. As a result of the invalidation of the following instructions fed after THIRD INSTRUCTION B1 that has detected the occurrence of an exception, there are no instructions under execution left in any one of the instruction execution parts. This deasserts SECOND EXCEPTION DETECTION SIGNAL 513 and SECOND INVALIDATION DEMAND SIGNAL 516 so that the instruction feed part 100 resumes instructions feeding.

In accordance with this embodiment, preceding instructions fed earlier than an instruction that has detected an exception, that is, the instructions that require a normal execution completion can be execution-controlled, regardless of the detection of the occurrence of an exception. Further, with additional information added to an instruction that has detected an exception, the invalidation of its subsequent instructions can be achieved easily. Because of this, the configuration of a data processor can be considerably simplified and the efficiency of processing is improved.

FIGS. 9(A) and 9(B) and FIGS. 10(A) and 10(B) are flow charts showing how instruction processing is invalidated in a case wherein an instruction which causes an exception does not detect the exception. The operation of invalidating instruction processing is the same as the one of FIGS. 4(A) and 4(B).

FIFTH EMBODIMENT

Figure 11:
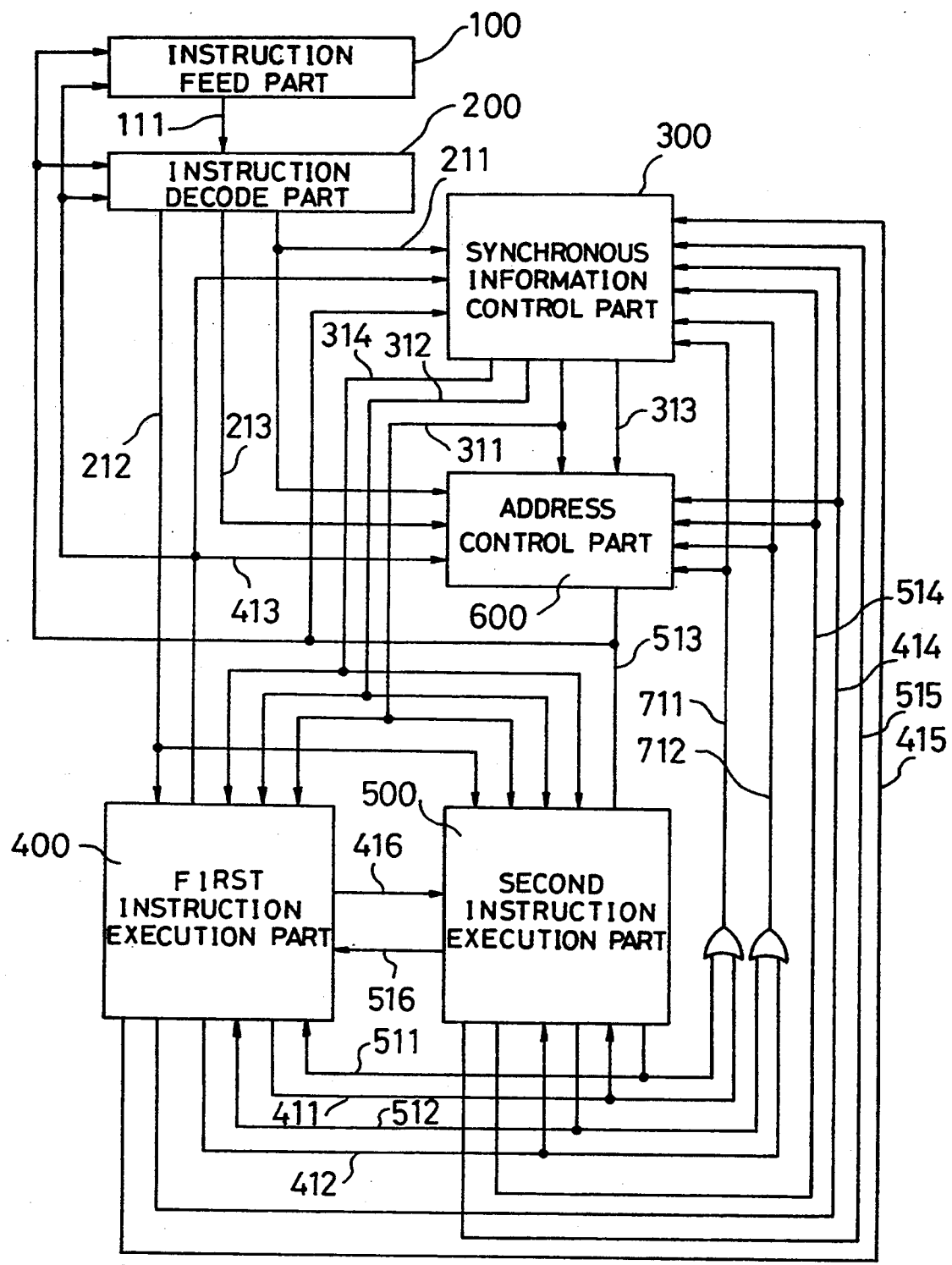
FIG. 11 is a block diagram showing the organization of a data processor of a fifth embodiment of the invention.

A fifth embodiment of the present invention is now described, which discloses a data processor that further performs the function of invalidating instruction processing, besides the functions of synchronizing instruction executions and of saving an instruction address to cope with the occurrence of an exception (as described in the foregoing first and second embodiments). FIG. 11 contains the contents of FIG. 3, and FIGS. 12(A) and 12(B) include the contents of FIGS. 4(A) and 4(B). Accordingly, this embodiment will be described below by pointing up additional features, particularly the differences between this embodiment and the fourth embodiment.

For a data processor, shown in FIG. 11, the instruction decode part 200 is supplied with FIRST EXCEPTION DETECTION SIGNAL 413 for instructions to be executed in the first instruction execution part 400, and with SECOND EXCEPTION DETECTION SIGNAL 513 for instructions to be executed in the second instruction execution part 500. In addition, the first instruction execution part 400 and the second instruction execution part 500 are respectively supplied with THIRD INFORMATION 314 that is generated by the synchronous information control part 300. THIRD INFORMATION 314 indicates the presence or absence of an exception detection in both the first instruction execution part 400 and the second instruction execution part 500, which is generated based on FIRST and SECOND EXCEPTION DETECTION SIGNALS 413 and 513. Each of the instruction execution parts 400 and 500 performs the function of invalidating the processing of instructions fed after an instruction that has detected the occurrence of an exception on the basis of THIRD INFORMATION added to them, when the processing of preceding instructions fed earlier than the instruction is all completed.

Figure 12A:
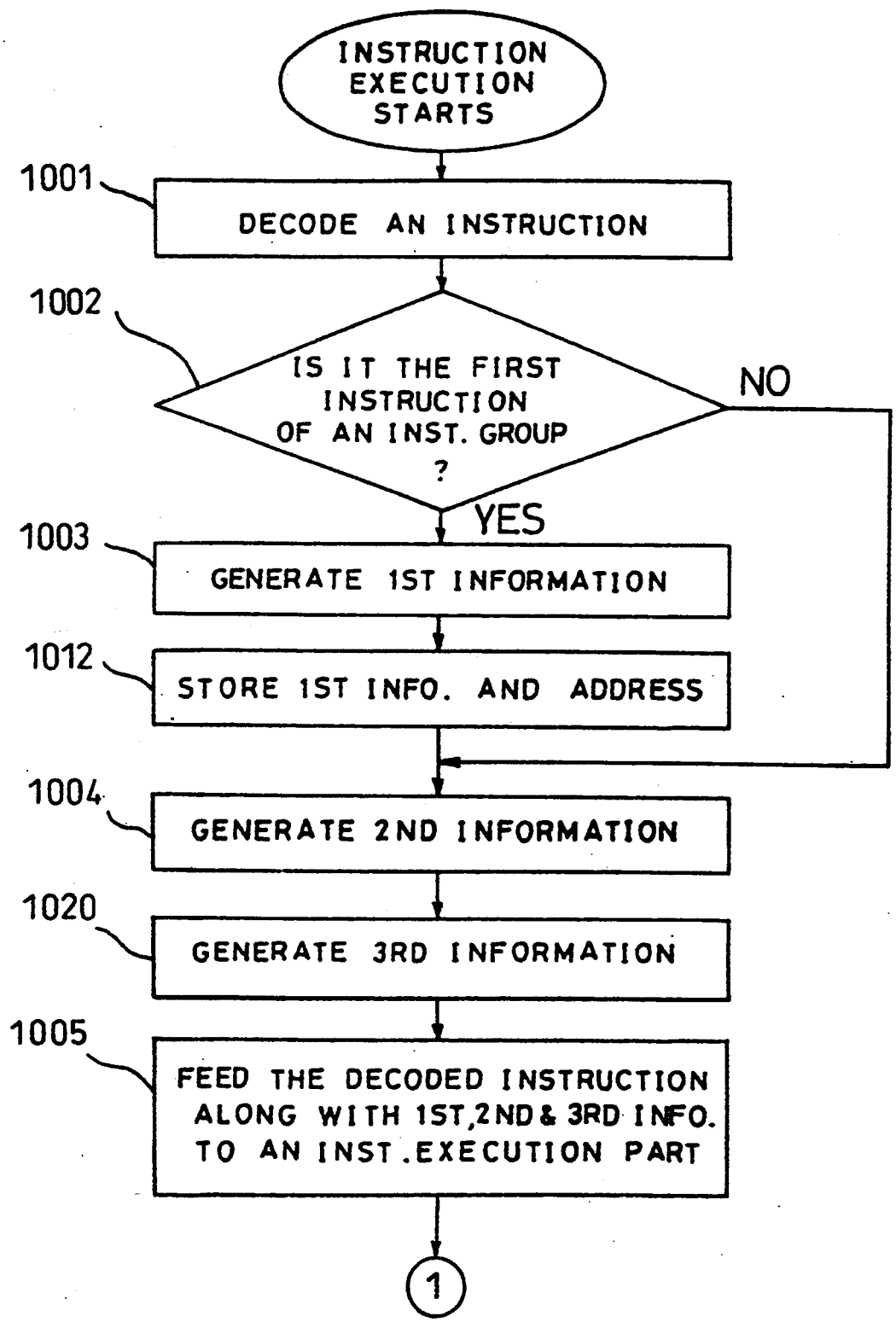
FIGS. 12(A) and 12(B) illustrate a first flow chart showing how the data processor of the fifth embodiment of the invention invalidates instruction processing when an exception occurs.
Figure 12B:
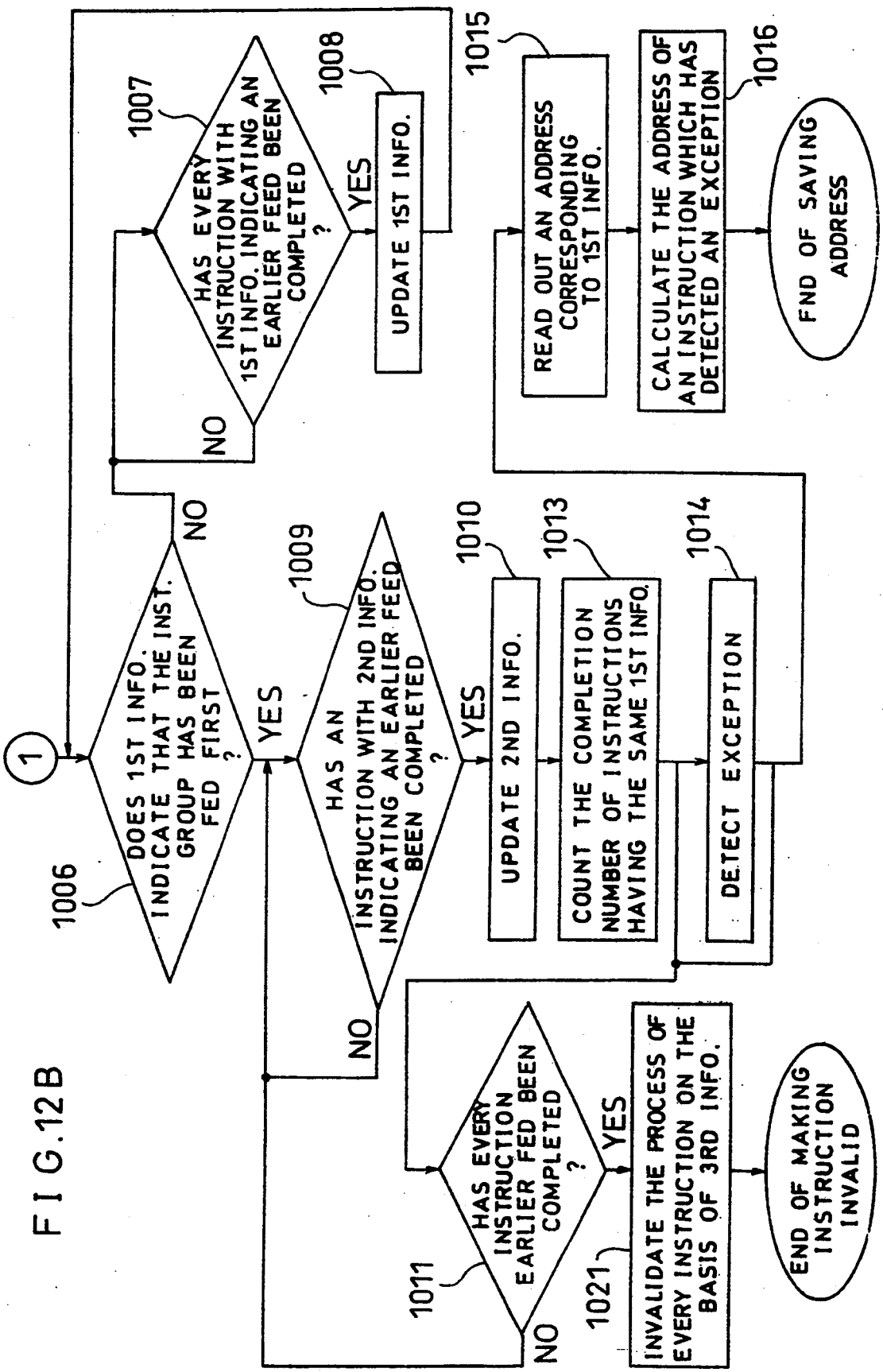
Figure 13A:
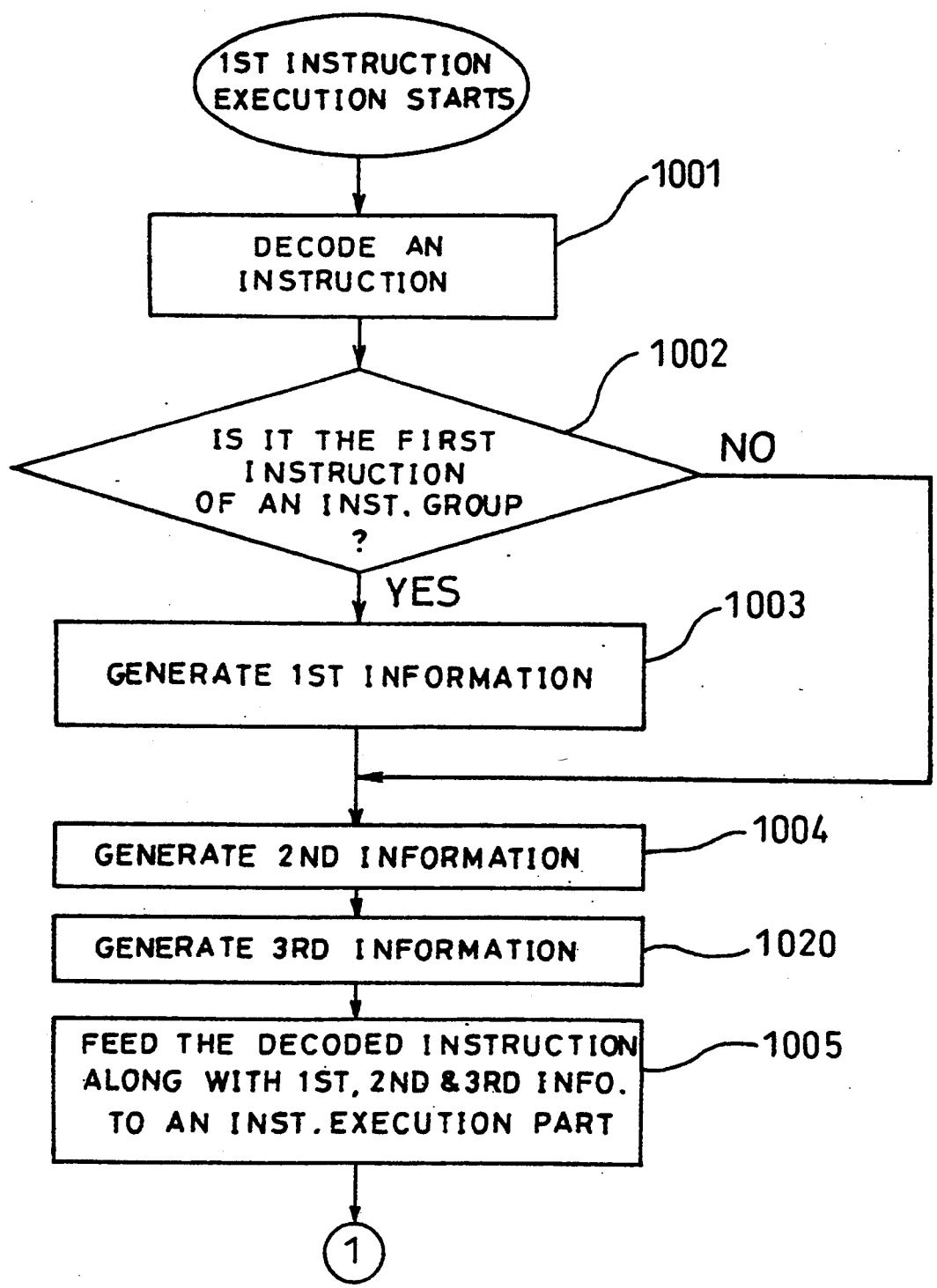
FIGS. 13(A) and 13(B) illustrate a first flow chart showing how the data processor of the fifth embodiment of the invention invalidates instruction processing in a modified way when an exception occurs.
Figure 13B:
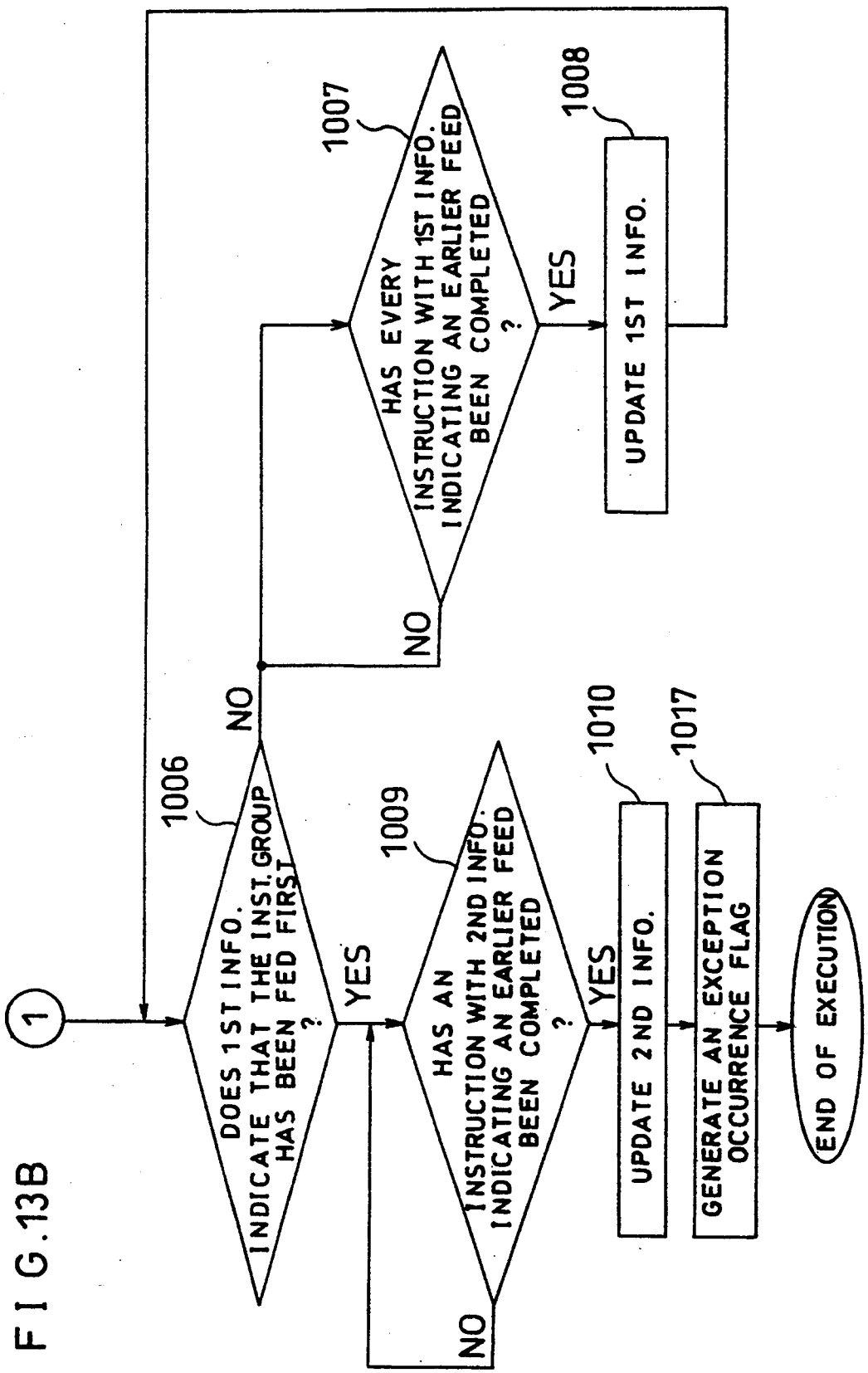
Figure 14A:
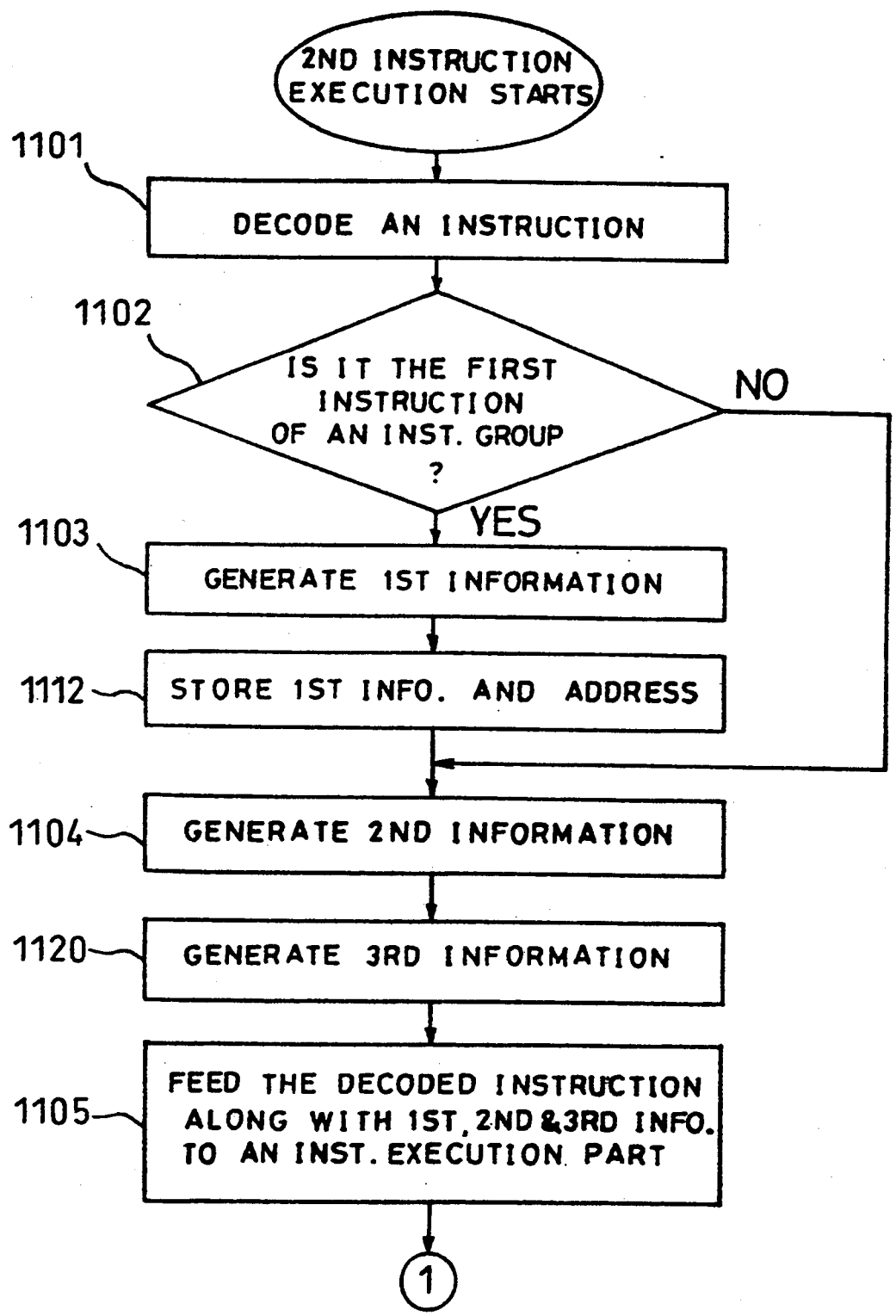

In the data processor with the above-described configuration, when instructions are fed to the first and second instruction execution parts 400 and 500 from the instruction decode part 200, THIRD INFORMATION 314, indicating the presence or absence of an exception detection for instructions under execution in the first and second instruction execution parts 400 and 500, is generated, besides FIRST and SECOND INFORMATION 311 and 312 (STEP 1020 of FIG. 12(A)). Unlike the fourth embodiment, even on the detection of exception the instruction feed part 100 does not stop feeding instructions, which sequentially feeds instructions of trap routines for exceptional handling. When the executions of instructions fed earlier than an instruction that has detected the occurrence of an exception are all completed (STEP 1011), in other words, when FIRST INFORMATION of an instruction that has detected the occurrence of an exception indicates a first group of instructions, and SECOND INFORMATION thereof indicates a first instruction of the first group of instructions, the processing of every non-trap routine instruction (i.e., every instruction requiring its re-execution after exceptional handling) is invalidated on the basis of THIRD INFORMATION added to each instruction (STEP 1021).

An example is given below to detail the foregoing invalidation of instruction processing at the time of the occurrence of an exception. Likewise, six instructions are fed from the instruction feed part 100 in the following order.

C1 →A1 →B1 →C2 →A2 →B2

Upon receiving FIRST INSTRUCTION C1 from the instruction feed part 100, the instruction decode part 200 decodes it. The synchronous information control part 300 generates FIRST INFORMATION 311 indicating that of all instructions to be executed in both the first and second execution parts 400 and 500, FIRST INSTRUCTION C1 belongs to a first group of instructions, SECOND INFORMATION 312 indicating that FIRST INSTRUCTION C1 is a first instruction of the first group of instructions, and THIRD INFORMATION 314 indicating that no exceptions have been detected in the first instruction execution part 400 or the second instruction execution part 500. FIRST INSTRUCTION C1 decoded, along with INFORMATION 311, 312 and 314, is fed to the first instruction execution part 400 to be processed. Then FIRST INSTRUCTION C1 starts being executed.

Upon receiving SECOND INSTRUCTION A1 from the instruction feed part 100, the instruction decode part 200 decodes it. The synchronous information control part 300 generates FIRST INFORMATION 311 indicating that of all instructions to be executed in both the first and second instruction execution parts 400 and 500, SECOND INSTRUCTION A1 belongs to a second group of instructions, SECOND INFORMATION 312 indicating that SECOND INSTRUCTION A1 is a first instruction of the second group of instructions, and THIRD INFORMATION 314 indicating that no exceptions have been detected in the first instruction execution part 400 or the second instruction execution part 500. SECOND INSTRUCTION A1 decoded, along with INFORMATION 311, 312 and 314, is fed to the first instruction execution part 400 to be processed. Then SECOND INSTRUCTION A1 starts being executed.

Upon receiving THIRD INSTRUCTION B1 from the instruction feed part 100, the instruction decode part 200 decodes it. The synchronous information control part 300 generates FIRST INFORMATION 311 indicating that of all instructions to be executed in both the first and second execution parts 400 and 500, THIRD INSTRUCTION B1 belongs to the second group of instructions, SECOND INFORMATION 312 indicating that THIRD INSTRUCTION B1 is a second instruction from SECOND INSTRUCTION A1 of the second group of instructions, and THIRD INFORMATION 314 indicating that no exceptions have been detected in the first instruction execution part 400 or the second instruction execution part 500. THIRD INSTRUCTION B1 decoded, along with INFORMATION 311, 312 and 314, is fed to the second instruction execution part 500 to be processed. Then THIRD INSTRUCTION B1 starts being executed.

Upon receiving FOURTH INSTRUCTION C2 from the instruction feed part 100, the instruction decode part 200 decodes it. The synchronous information control part 300 generates FIRST INFORMATION 311 indicating that of all instructions to be executed in both the first and second instruction execution parts 400 and 500, FOURTH INSTRUCTION C2 belongs to the second group of instructions, SECOND INFORMATION 312 indicating that FOURTH INSTRUCTION C2 is a third instruction of the second group of instructions, and THIRD INFORMATION 314 indicating that no exceptions have been detected in the first instruction execution part 400 or the second instruction execution part 500, FOURTH INSTRUCTION C2 decoded, along with INFORMATION 311, 312 and 314, is fed to the second instruction execution part 500 to be processed. Then FOURTH INSTRUCTION C2 starts being executed. FIRST and SECOND INFORMATION of each one of the instructions in the above state are shown in STATE 1 of TABLE.

If the occurrence of an exception is detected in executing THIRD INSTRUCTION B1 in the second instruction execution part 500 when INSTRUCTIONS C1 through C2 are fed, as in the second and fourth embodiments, the executions of INSTRUCTIONS C1 and A1, fed earlier than THIRD INSTRUCTION B1 from the instruction feed part 100, will continue until they are completed. The operation of saving the address of THIRD INSTRUCTION B1 and then invalidating instructions (i.e., the instructions fed after THIRD INSTRUCTION B1) in both the first instruction execution parts 400 and 500 starts so that the instruction execution can resume starting with THIRD INSTRUCTION B1 after exceptional handling.

More specifically, the detection of an exception in THIRD INSTRUCTION B1 asserts SECOND EXCEPTION DETECTION SIGNAL 513 whereby the fact that such an exception is taking place in the second instruction execution part 500 is communicated to the instruction feed part 100, the instruction decode part 200, the synchronous information control part 300 and the address control part 600. THIRD INSTRUCTION B1, which has detected the occurrence of an exception, keeps having an exception detection flag that signals the detection of an exception until the executions of INSTRUCTIONS C1 and A1 are completed. In response to SECOND EXCEPTION DETECTION SIGNAL 513, the instruction decode part 200 sets a transfer flag in preparation for the supply of a group of trap routine instructions for exceptional handling. As shown in the second embodiment, while deriving the address of THIRD INSTRUCTION B1 so that it can be saved, the executions of the preceding instructions, FIRST and SECOND INSTRUCTIONS C1 and A1 continue. The instruction feed part 100 commences feeding trap routine instructions (INSTRUCTIONS D1, D2, D3 ... Dn) when it is informed of the occurrence of an exception. The following describes the processing of INSTRUCTIONS C1 and A1 to be continued, and shows how the processing of the following instructions (excluding those for exceptional handling) fed after THIRD INSTRUCTION B1 is invalidated.

The completion of the execution of FIRST INSTRUCTION C1 in the first instruction execution part 400 asserts FIRST IECS 411 and SECOND IECS 412, since FIRST INSTRUCTION C1 has FIRST INFORMATION indicating that of all instructions under execution in both first and second instruction execution parts 400 and 500, FIRST INSTRUCTION C1 belongs to a first group of instructions, and SECOND INFORMATION indicating that FIRST INSTRUCTION C1 is a first (and last) instruction of the first group of instructions. Due to such assertion, respective FIRST INFORMATION of SECOND INSTRUCTION A1 under execution in the first instruction execution part 400, and THIRD and FOURTH INSTRUCTIONS B1 and C2 under execution in the second instruction execution part 500 is updated, as shown in STATE 2 of TABLE.

Here, INSTRUCTION D1 of a trap routine for exceptional handling is fed from the instruction feed part 100. The instruction decode part 200 learns from the set transfer flag in response to SECOND EXCEPTION DETECTION SIGNAL 513 that INSTRUCTION D1 is a first instruction of a group of instructions having successive instruction addresses, sends DECODED INFORMATION 211 of INSTRUCTION D1, and resets the transfer flag. Based on DECODED INFORMATION 211 indicating that INSTRUCTION D1 is the first instruction, the synchronous information control part 300 generates FIRST INFORMATION 311 indicating that of all instructions to be executed in both the first and second instruction execution parts 400 and 500. INSTRUCTION D1 belongs to a second group of instructions, SECOND INFORMATION 312 indicating that INSTRUCTION D1 is a first instruction of the second group of instructions, and THIRD INFORMATION 314 indicating that an exception has been detected. INSTRUCTION D1 decoded, along with INFORMATION 311, 312 and 314, is fed to, for example, the first instruction execution part 400 to be processed. Then INSTRUCTION D1 starts being executed.

The completion of the execution of SECOND INSTRUCTION A1 in the first instruction execution part 400 asserts SECOND IECS SIGNAL 412, since SECOND INSTRUCTION A1 has FIRST INFORMATION indicating that of all instructions under execution in both the first and second instruction execution parts 400 and 500, SECOND INSTRUCTION A1 belongs to a first group of instructions, and SECOND INFORMATION indicating that SECOND INSTRUCTION A1 is a first instruction of the first group of instructions. Due to this assertion, respective SECOND INFORMATION of THIRD and FOURTH INSTRUCTIONS B1 and C2 under execution in the second instruction execution part 500 is updated. Then FIRST INFORMATION and SECOND INFORMATION, added to THIRD INSTRUCTION B1 that has detected the occurrence of an exception, now indicate that of all instructions under execution in both the first and second instruction execution parts 400 and 500, THIRD INSTRUCTION B1 becomes a first instruction of a first group of instructions. This results in asserting SECOND INVALIDATION DEMAND SIGNAL 516, based on THIRD INSTRUCTION B1's exception detection flag, and then the processing of the following instructions, fed after THIRD INSTRUCTION B1, in both the first and second instruction execution parts 400 and 500 is invalidated. However, the invalidation of instruction processing is carried out on a limited basis so that only instructions, having THIRD INFORMATION indicating that there have occurred no exceptions in the first instruction execution part 400 or the second instruction execution part 500, are subject to such invalidation. In other words, both of THIRD and FOURTH INSTRUCTIONS B1 and C2 are invalidated in preparation for their re-execution after exceptional handling, although the execution of INSTRUCTION D1 for exceptional handling continues.

Thereafter, INSTRUCTIONS (D2, D3 ... Dn) fed from the instruction feed part 100, along with their additional THIRD INFORMATION 314 indicating the occurrence of an exception, are fed to the respective instruction execution parts to be processed. The feed of the last one of the group of instructions for exceptional handling deasserts SECOND EXCEPTION DETECTION SIGNAL 513 and SECOND INVALIDATION DEMAND SIGNAL 516 so that the instruction processing will resume starting with INSTRUCTION B1 the address of which has been saved.

In accordance with this embodiment, preceding instructions fed earlier than an instruction that has detected an exception, that is, the instructions that require a normal execution completion can be execution-controlled, regardless of the detection of the occurrence of an exception. Further, with additional information added to an instruction that has detected an exception, the invalidation of its subsequent instructions can be achieved easily. Besides, exceptional handling can be performed at a high speed, because instructions for exceptional handling can be fed early to an instruction execution part, as a separate supply from that of instructions to be invalidated, based on THIRD INFORMATION. Because of this, the configuration of a data processor can be considerably simplified and the efficiency of processing is improved.

FIGS. 13(A) and 13(B) and FIGS. 14(A) and 14(B) are flow charts showing how instruction processing is invalidated in a case wherein an instruction which causes an exception does not detect the exception. The operation of invalidating instruction processing is the same as the one of FIG. 12.

I claim:

1. A data processor comprising:

a plurality of instruction execution parts, each of which executes instructions depending on supplemental information supplied with such instructions;

an instruction feed part for feeding instructions in order for execution thereof in said plurality of instruction execution parts;

an instruction decode part for individually decoding the instructions fed from said instruction feed part thereby feeding the instructions decoded to said plurality of instruction execution parts for execution processing thereof, and for outputting decoded information indicating which of said plurality of instruction execution parts is to execute each one of the instructions decoded and whether each of the instructions decoded is a first instruction of a group of instructions having successive instruction addresses; and a synchronous information control part for generating first information indicating an order of feed of each group of instructions having successive instruction addresses, and second information indicating an order of feed of instructions of each group of instructions, based on decoded information supplied from said instruction decode part, thereby feeding the first information and the second information thus generated to one of said plurality of instruction execution parts where a corresponding instruction is executed so that the first information and the second information are added to the corresponding instruction: wherein:

each of said plurality of instruction execution parts allows execution of an instruction to be completed, provided that the aforesaid instruction has additional information, comprised of the first information and the second information, indicating that of all instructions fed to said plurality of instruction execution parts, the aforesaid instruction is a first instruction of a first group of instructions, in order to synchronize instruction executions between said plurality of instruction execution parts;

every time the execution of one instruction of a group of instructions is completed the second information of other instructions of the aforesaid group of instructions is updated; and every time the executions of all instructions of a first group of instructions are completed the first information of all other instructions of different groups of instructions is updated.

2. The data processor of claim 1 which further includes an address control part for holding the first information for a first instruction of a group of instructions generated by said synchronous information control part, and an address of the aforesaid first instruction, wherein:

each of said plurality of instruction execution parts performs a function of detecting an exception, caused when executing an instruction in said plurality of instruction execution parts, by means of any one of instructions in said plurality of instruction execution parts, and of sending an exception detection signal on the detection of such an exception;

said synchronous information part further comprising:

counting a number of execution completion of instructions belonging to a first group of instructions in said plurality of instruction execution parts; and generating an address correction value for deriving an address of the instruction that has detected the exception, in response to the exception detection signal sent from either one of said plurality of instruction execution parts, based on the number of execution completion obtained by the aforesaid count and the second information of the instruction that has detected the aforesaid exception; and said address control part further comprising:

reading, in response to the exception detection signal sent from either one of said plurality of instruction execution parts, the address of a first instruction of a group of instructions to which the instruction that has detected the exception belongs from among addresses held therein, based on the first information of the instruction that has detected the exception, and deriving an address of the instruction that has detected the exception for saving thereof with using the address read and the address correction value generated by said synchronous information control part.

3. The data processor of claim 2, wherein each of said plurality of instruction execution parts further comprising having an instruction that has caused an exception detect such an exception.

4. The data processor of claim 2, wherein each of said plurality of instruction execution parts further comprising generating an exception detection signal by an instruction that has caused an exception so that such an exception is detected by another instruction fed after the instruction that has caused the exception and executed in a same instruction execution part as the instruction that has caused the exception, based on the exception detection signal.

5. The data processor of claim 2, wherein: said instruction feed part further comprising stopping feeding next instructions in response to the exception detection signal sent from either one of said plurality of instruction execution parts; and said plurality of instruction execution parts further comprising invalidating processing of all instructions in said plurality of instruction execution parts, provided that execution of all preceding instructions fed earlier than the instruction that has detected the aforesaid exception is completed in said plurality of instruction execution parts, and that the instruction that has detected the aforesaid exception becomes one having additional information, comprised of the first information and the second information, indicating a first instruction of a first group of instructions.

6. The data processor of claim 2, wherein:

said synchronous information control part further comprising generating third information indicating a presence or absence of the occurrence of an exception in said plurality of instruction execution parts according to presence or absence of the exception detection signal from said plurality of instruction execution parts, and of feeding the third information, along with the first information and the second information, to one of said plurality of instruction execution parts where a corresponding instruction is executed so that the first information, the second information, and the third information are added to the corresponding instruction;

said instruction feed part further comprising feeding following instructions belonging to a different group of instructions used for exceptional handling of the aforesaid exception detected to said instruction decode part, in response to the exception detection signal sent from either one of said plurality of instruction execution parts; and said plurality of instruction execution parts further comprising invalidating the processing of all instructions, excluding those having the third information that indicates the occurrence of an exception in said plurality of instruction execution parts, provided that the executions of all preceding instructions fed earlier than the instruction that has detected the aforesaid exception are completed in said plurality of instruction execution parts, and that the instruction that has detected the aforesaid exception becomes an instruction having additional information, comprised of the first information and the second information, indicating a first instruction of a first group of instructions.

7. A data processing method of synchronizing instruction executions in a data processor having a plurality of instruction execution parts comprising:

generating first information indicating an order of feed of each group of instructions that are fed in order and have successive instruction addresses;

generating second information indicating an order of feed of instructions of each group of instructions;

feeding each instruction along with the first information and the second information to one of said plurality of instruction execution parts for the execution processing thereof;

allowing the execution of a certain instruction to be completed having additional information, comprised of the first information and the second information, indicating a first instruction of a first group of instructions, of all other instructions fed to said plurality of instruction execution parts;

updating, every time execution of one instruction of a group of instructions is completed in said plurality of instruction execution parts, the second information of other instructions of a same group of instructions; and updating, every time the executions of all instructions of a first group of instructions are completed in said plurality of instruction execution parts, the first information of all other instructions of different groups of instructions.

8. The data processing method of synchronizing instruction executions of claim 7 further including a step of identifying a first instruction of a group of instructions having successive instruction addresses by deciding whether one instruction fed is fed following another with a nature of changing program flow, for generating the first information and the second information.

9. The data processing method of synchronizing instruction executions of claim 7 including a saving method of saving an instruction address in a data processor with a plurality of instruction execution parts when an exception occurs comprising:

generating first information indicating the order of feed of each group of instructions that are fed in order and have successive instruction addresses;

storing, on the condition that an instruction fed is a first instruction of a group of instructions having successive instruction addresses, the first information and instruction address of such an instruction;

generating second information indicating an order of feed of instructions of each group of instructions;

feeding each instruction along with the first information and the second information to one of said plurality of instruction execution parts for execution processing thereof;

allowing execution of a certain instruction to be completed having additional information, comprised of the first information and the second information, indicating a first instruction of a first group of instructions, of all other instructions fed to said plurality of instruction execution parts;

updating, every time execution of one instruction of a group of instructions is completed in said plurality of instruction execution parts, the second information of the other instructions of the same group of instructions;

updating, every time execution of all instructions of a first group of instructions is completed in said plurality of instruction execution parts, the first information of all other instructions of different groups of instructions;

counting a number of execution completions of instructions of a first group of instructions in said plurality of instruction execution parts;

detecting occurrence of an exception, caused when executing an instruction in said plurality of instruction execution parts, by any one of instructions in said plurality of instruction execution parts;

reading, based on the first information of the instruction that has detected the exception, an instruction address of a first instruction of a group of instructions to which the instruction that has detected the exception belongs, from among the instruction addresses stored; and deriving and saving the instruction address of the instruction that has detected the exception, based on the number of execution completions of instructions counted, the second information of the instruction that has detected the exception, and an instruction address of the first instruction read.

10. The saving method of saving an instruction address when an exception occurs of claim 9, wherein said step of detecting occurrence of an exception caused when executing an instruction includes a step of detecting the occurrence of an exception by the instruction itself that has caused the exception.

11. The saving method of saving an instruction address when an exception occurs of claim 9, wherein said step of detecting occurrence of an exception caused when executing an instruction comprising:

generating an exception detection signal by the instruction that has caused the exception; and detecting the exception by another instruction fed after the instruction that has caused the exception and executed in a same instruction execution part as the instruction that has caused the exception, based on the exception detection signal.

12. The data processing method of synchronizing instruction executions of claim 7 including an invalidation method of invalidating instruction processing in a data processor with a plurality of instruction execution parts when an exception occurs comprising:

generating first information indicating the order of feed of each group of instructions that are fed in order and have successive instruction addresses;

storing, based on a condition that an instruction fed is a first instruction of a group of instructions having successive instruction addresses, the first information and instruction address of such an instruction;

generating second information indicating the order of feed of instructions of each group of instructions;

feeding each instruction along with the first information and the second information to one of said plurality of instruction execution parts for execution processing thereof;

allowing execution of a certain instruction to be completed having additional information, comprised of the first information and the second information, indicating a first instruction of a first group of instructions, of all instructions fed to said plurality of instruction execution parts;

updating, every time execution of one instruction of a group of instructions is completed in said plurality of instruction execution parts, the second information of other instructions of the same group of instructions;

updating, every time execution of all instructions of a first group of instructions is completed in said plurality of instruction execution parts, the first information of all other instructions of different groups of instructions;

counting a number of execution completions of instructions of a first group of instructions in said plurality of instruction execution parts;

detecting occurrence of an exception caused when executing an instruction in said plurality of instruction execution parts by any one of instructions in said instruction execution parts;

stopping feeding next instructions upon detection of the exception;

reading, based on the first information of the instruction that has detected the exception, an instruction address of a first instruction of a group of instructions to which the instruction that has detected the exception belongs, from among instruction addresses stored;

deriving and saving an instruction address of the instruction that has detected the exception, based on the number of execution completions of instructions counted, the second information of the instruction that has detected the exception, and an instruction address of the first instruction read; and invalidating the processing of all instructions in said plurality of instruction execution parts, provided that execution of all preceding instructions fed earlier than the instruction that has detected the aforesaid exception is completed in said plurality of instruction execution parts, and that the instruction that has detected the aforesaid exception becomes an instruction having additional information, comprised of the first information and the second information, indicating a first instruction of a first group of instructions.

13. The data processing method of synchronizing instruction executions of claim 7 including an invalidation method of invalidating instruction processing in a data processor with a plurality of instruction execution parts when an exception occurs comprising:

generating first information indicating the order of feed of each group of instructions that are fed in order and have successive instruction addresses;

storing, based on a condition that an instruction fed is a first instruction of a group of instructions having successive instruction addresses, the first information and instruction address of such an instruction;

generating second information indicating the order of feed of instructions of each group of instructions;

generating third information indicating that no exceptions occur in any one of said plurality of instruction execution parts;

feeding each instruction along with the first information, the second information, and the third information to one of said plurality of instruction execution parts for execution processing thereof;

allowing execution of a certain instruction to be completed having additional information, comprised of the first information and the second information, indicating a first instruction of a first group of instructions, of all other instructions fed to said plurality of instruction execution parts;

updating, every time execution of one instruction of a group of instructions is completed in said plurality of instruction execution parts, the second information of the other instructions of the same group of instructions;

updating, every time execution of all instructions of a first group of instructions is completed in said plurality of instruction execution parts, the first information of all other instructions of different groups of instructions;

counting a number of execution completion of instructions of a first group of instructions in said plurality of instruction execution parts;

detecting occurrence of an exception caused when executing an instruction in said plurality of instruction execution parts by any one of instructions in said plurality of instruction execution parts;

feeding a following instruction of a different group of instructions for exceptional handling of the instruction that has caused the exception, along with the first information, the second information, and the third information changed to indicate the occurrence of the exception, to one of said plurality of instruction execution parts for execution processing thereof;

reading, based on the first information of the instruction that has detected the exception, an instruction address of a first instruction of a group of instructions to which the instruction that has detected the exception belongs, from among instruction addresses stored;

deriving and saving an instruction address of the instruction that has detected the exception, based on the number of execution completions of instructions counted, the second information of the instruction that has detected the exception, and an instruction address of the first instruction read; and invalidating the processing of all instructions, excluding those having the third information indicating the occurrence of the exception in said plurality of instruction execution parts, provided that execution of all preceding instructions fed earlier than the instruction that has detected the aforesaid exception is completed in said plurality of instruction execution parts, and that the instruction that has detected the aforesaid exception becomes an instruction having additional information, comprised of the first information and the second information, indicating a first instruction of a first group of instructions.

14. The invalidation method of invalidating instruction processing when an exception occurs according to claims 12 or 13, wherein said step of detecting the occurrence of an exception caused when executing an instruction includes a step of detecting the occurrence of an exception by the instruction itself that has caused the exception.

15. The invalidation method of invalidating instruction processing when an exception occurs according to claims 12 or 13, wherein said step of detecting the occurrence of an exception caused when executing an instruction comprising:

generating an exception occurrence flag by the instruction that has caused the exception; and detecting the exception by another instruction fed after the instruction that has caused the exception and executed in a same instruction execution part as the instruction that has caused the exception, based on the exception occurrence flag.

* * * * *